United States Patent
Xie et al.

(10) Patent No.: US 9,473,233 B2
(45) Date of Patent: Oct. 18, 2016

(54) METHOD AND APPARATUS FOR TRANSMITTING DATA USING RELAY DEVICE

(71) Applicant: SAMSUNG ELECTRONICS CO., LTD., Suwon-si (KR)

(72) Inventors: Yongxing Xie, Science City (CN); Qichao Yan, Science City (CN); Jae-sun Park, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 14/743,394

(22) Filed: Jun. 18, 2015

(65) Prior Publication Data
US 2015/0372746 A1 Dec. 24, 2015

(30) Foreign Application Priority Data

Jun. 18, 2014 (CN) .......................... 2014 1 0274052
Apr. 28, 2015 (KR) ........................ 10-2015-0060083

(51) Int. Cl.
| | | |
|---|---|---|
| H04B 7/15 | (2006.01) | |
| H04B 7/155 | (2006.01) | |
| H04W 4/00 | (2009.01) | |
| H04W 76/02 | (2009.01) | |
| H04L 1/18 | (2006.01) | |

(52) U.S. Cl.
CPC ............. *H04B 7/155* (2013.01); *H04L 1/1829* (2013.01); *H04W 4/008* (2013.01); *H04W 76/02* (2013.01); *H04W 76/027* (2013.01)

(58) Field of Classification Search
CPC .. H04W 4/008; H04W 76/02; H04W 76/027
USPC .......... 455/41.1, 41.2, 456.1, 11.1, 561, 569, 455/553.1, 411, 7, 39; 370/338, 310, 280; 320/103; 726/6, 4, 5; 381/57; 340/10.1; 704/246; 709/204; 345/156; 702/158; 348/734
See application file for complete search history.

(56) References Cited

U.S. PATENT DOCUMENTS

| | | | | |
|---|---|---|---|---|
| 7,221,961 | B1* | 5/2007 | Fukumoto | G06F 1/1616 455/41.2 |
| 8,787,271 | B2* | 7/2014 | Um | H04W 72/1205 370/328 |
| 2003/0027607 | A1* | 2/2003 | Hatakeyama | H04M 1/6066 455/569.2 |
| 2003/0095211 | A1* | 5/2003 | Nakajima | G08C 19/28 348/734 |
| 2003/0220765 | A1* | 11/2003 | Overy | H04L 63/0492 702/158 |
| 2007/0110011 | A1* | 5/2007 | Nelson | H04W 88/04 370/338 |
| 2007/0274241 | A1* | 11/2007 | Brothers | H04L 67/06 370/310 |
| 2008/0204199 | A1* | 8/2008 | Howarth | G08B 13/2417 340/10.1 |
| 2010/0167754 | A1* | 7/2010 | Jolivet | H04W 8/205 455/456.1 |
| 2010/0190433 | A1* | 7/2010 | Zhang | H04B 7/15592 455/7 |

(Continued)

*Primary Examiner* — Tan H Trinh
(74) *Attorney, Agent, or Firm* — Sughrue Mion, PLLC

(57) ABSTRACT

A relay device is provided, which includes a short distance wireless communicator configured to establish a short distance wireless communication connection between the relay device and a first communication device; and a processor configured to transmit to the first communication device information regarding at least one device connectable to the relay device, receive from the first communication device a data relay request requesting a transmission of data to a second communication device selected by a user of the first communication device from the at least one device connectable to the relay device, and control the short distance wireless communicator to transmit the data from the first communication device to the second communication device in response to the data relay request.

18 Claims, 22 Drawing Sheets

(56) References Cited

U.S. PATENT DOCUMENTS

| | | | | |
|---|---|---|---|---|
| 2011/0053558 | A1* | 3/2011 | Teague | H04L 9/3273 455/411 |
| 2011/0320535 | A1* | 12/2011 | Donaldson | H04W 4/00 709/204 |
| 2012/0015602 | A1* | 1/2012 | Murakami | H04B 7/155 455/7 |
| 2012/0122399 | A1* | 5/2012 | Kim | H04W 76/023 455/41.2 |
| 2012/0289158 | A1* | 11/2012 | Palin | H04W 8/005 455/41.2 |
| 2013/0157566 | A1* | 6/2013 | Oguchi | H04W 4/008 455/41.1 |
| 2013/0252555 | A1* | 9/2013 | Kim | H04W 76/02 455/41.2 |
| 2013/0316649 | A1* | 11/2013 | Newham | H04W 88/04 455/41.2 |
| 2014/0046664 | A1* | 2/2014 | Sarkar | H04W 12/06 704/246 |
| 2014/0068719 | A1* | 3/2014 | Kiukkonen | H04W 12/08 726/4 |
| 2014/0075523 | A1* | 3/2014 | Tuomaala | H04L 63/083 726/6 |
| 2014/0117921 | A1* | 5/2014 | Suomela | H04B 5/0031 320/103 |
| 2014/0125575 | A1* | 5/2014 | Samanta Singhar | G06F 3/005 345/156 |
| 2014/0207313 | A1* | 7/2014 | Nishidai | B60R 25/00 701/2 |
| 2014/0321654 | A1* | 10/2014 | Kim | H03G 3/32 381/57 |
| 2015/0031288 | A1* | 1/2015 | Tubbesing | H04W 4/008 455/41.1 |

* cited by examiner

METHOD AND APPARATUS FOR TRANSMITTING DATA USING RELAY DEVICE

CROSS-REFERENCE TO RELATED APPLICATIONS

This application claims the benefit of Korean Patent Application No. 10-2015-0060083, filed on Apr. 28, 2015, in the Korean Intellectual Property Office, and Chinese Patent Application No. 201410274052.8, filed on Jun. 18, 2014, in the State Intellectual Property Office of the P.R.C., the disclosures of which are incorporated herein in their entirety by reference.

BACKGROUND

1. Field

One or more exemplary embodiments relate to a method and apparatus for transmitting data using a relay device.

2. Description of the Related Art

One or more exemplary embodiments relate to a data transmission between a relay device and a communication device, and, in particular, a method, device, and system for transmitting data between communication devices connected to a relay device.

The present disclosure relates to data transmission between a relay device and a communication device, more particularly, to a device and method of transmitting data between communication devices connected to a relay device, and a system thereof.

With the popularity of communication devices, an increasing number of users transmit various data (e.g., documents, pictures, or videos) via communication devices. In a conventional manner of transmitting data between communication devices, short-distance communication technologies (e.g., BLUETOOTH or WI-FI) are generally used. The operational procedure generally includes first establishing a short-distance communication connection between two communication devices and then transmitting data until the completion of the transmission. Before the transmission of the data, two communication devices may be required to be paired.

Although the existing pairing manner and its corresponding data transmission may be directly performed between two communication devices, communication devices may be difficult to control therebetween.

SUMMARY

One or more exemplary embodiments include data transmission between a plurality of communication devices using a relay device.

Additional aspects will be set forth in part in the description which follows and, in part, will be apparent from the description, or may be learned by practice of the presented exemplary embodiments.

According to an aspect of an exemplary embodiment, a relay device includes a short distance wireless communicator configured to establish a short distance wireless communication connection between the relay device and a first communication device; and a processor configured to transmit to the first communication device information regarding at least one device connectable to the relay device, receive from the first communication device a data relay request requesting a transmission of data to a second communication device selected by a user of the first communication device from the at least one device connectable to the relay device, and control the short distance wireless communicator to transmit the data from the first communication device to the second communication device in response to the data relay request.

The information regarding the at least one device can include at least one of a name of the at least one device, BLUETOOTH profile information, and information indicating whether a wireless communication connection is established between the relay device and the at least one device.

The at least one device connectable to the relay device can include a communication device that is paired with the relay device and whose connection information is stored in the relay device.

The connection information can include at least one of a BLUETOOTH address and a link key.

The relay device can further include a storage configured to store the data received from the first communication device, wherein the processor is further configured to determine whether the short distance wireless communication connection is established between the second communication device and the short distance wireless communicator upon receiving the data relay request from the first communication device, and, if the short distance wireless communication connection is not established between the second communication device and the short distance wireless control, the processor is further configured to control the storage unit to store the data received from the first communication device in the relay device.

The processor is further configured to store the data received from the first communication device, and then, if the short distance wireless communication connection is established between the second communication device and the short distance wireless communication unit, transmit the stored data to the second communication device.

The relay device can further include a display configured to display identification information of the data stored in the relay device if the short distance wireless communication connection is established between the second communication device and the short distance wireless communication unit.

Upon receiving the data relay request, the processor is configured to transmit to the second communication device an acknowledge request requesting the second communication device to acknowledge whether to receive the data, to receive from the second communication device a response to the acknowledge request, and to transmit the data to the second communication device based on the response.

According to another aspect of an exemplary embodiment, a data relay method can include establishing a short distance wireless communication connection between a relay device and a first communication device; transmitting information regarding at least one device connectable to the relay device to the first communication device; receiving, from the first communication device, a data relay request requesting a transmission of data to a second communication device selected by a user of the first communication device from the at least one device; and transmitting the data to the second communication device in response to the data relay request.

The information regarding the at least one device can include at least one of a name of the at least one device, BLUETOOTH profile information, and information indicating whether a wireless communication connection is established between the relay device and the at least one device.

The at least one device connectable to the relay device can include a communication device that is paired with the relay device and stores connection information in the relay device.

The connection information can include at least one of a BLUETOOTH address and a link key.

The transmitting of the data to the second communication device in response to the data relay request can include determining whether a short distance wireless communication connection is established between the second communication device and relay device upon receiving a data relay request from the first communication device; and if the short distance wireless communication connection is not established between the second communication device and the relay device, storing the data from the first communication device in the relay device.

The transmitting of the data to the second communication device in response to the data relay request can include storing the data, and then, if the short distance wireless communication connection is established between the second communication device and the relay device, transmitting the stored data to the second communication device.

The method can further include displaying identification information of the stored data if the short distance wireless communication connection is established between the second communication device and the relay device.

The transmitting of the data to the second communication device in response to the data relay request can further include upon receiving the data relay request from the first communication device, transmitting to the second communication device an acknowledge request requesting the second communication device to acknowledge whether to receive the data; receiving from the second communication device a response to the acknowledge request; and transmitting the data r to the second communication device based on the response.

According to another aspect of an exemplary embodiment, a first communication device can include a short distance wireless communicator configured to establish a short distance wireless communication connection between the first communication device and a relay device; and a processor configured to receive from the relay device information regarding at least one device connectable to the relay device, transmit to the relay device a data relay request requesting a transmission of data to a second communication device selected by a user of the first communication device from the at least one device connectable to the relay device, and to control the short distance wireless communicator to transmit the data to the relay device.

The information regarding the at least one device can include at least one of a name of the at least one device, BLUETOOTH profile information, and information indicating whether a wireless communication connection is established between the relay device and the at least one device.

According to another aspect of an exemplary embodiment, a data relay method can include establishing a short distance wireless communication connection between a relay device and a first communication device; receiving from the relay device information regarding at least one device connectable to the relay device; selecting a second communication device from the at least device based on the information regarding the at least one device; transmitting a data relay request to the relay device requesting a transmission of data to the second communication device; and transmitting the data to relay device.

The information regarding the at least one device can include at least one of a name of the at least one device, BLUETOOTH profile information, and information indicating whether a wireless communication connection is established between the relay device and the at least one device.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
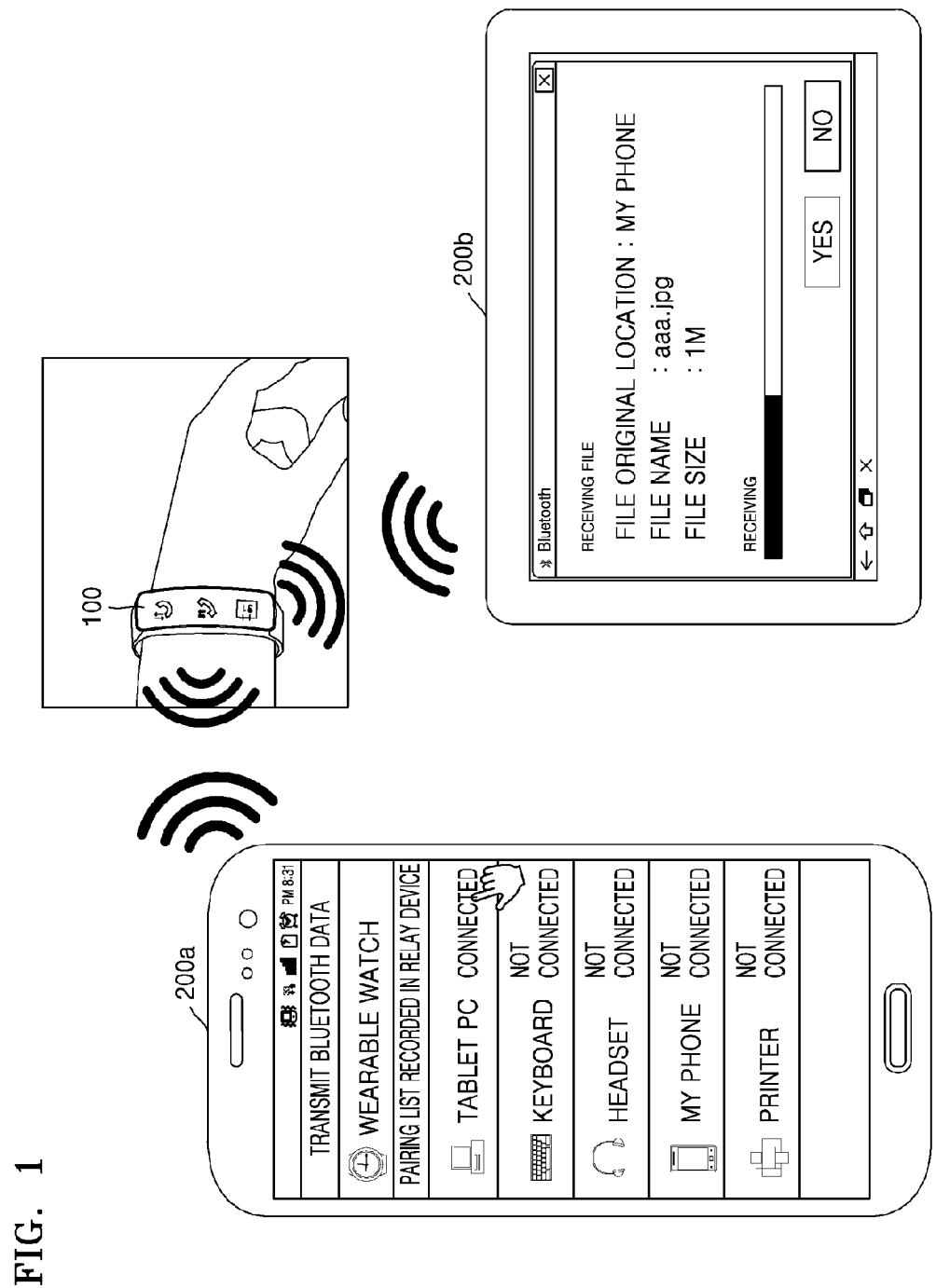
FIG. 1 is a diagram for describing a method in which a relay device relays data between a plurality of communication devices, according to an exemplary embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present description. As used herein, expressions such as "at least one of," when preceding a list of elements, modify the entire list of elements and do not modify the individual elements of the list.

Terms used herein will be briefly described, and exemplary embodiments will be described in detail below.

General and widely-used terms have been employed herein, in consideration of functions provided in the exemplary embodiments, and may vary according to an intention of one of ordinary skill in the art, a precedent, or emergence of new technologies. Additionally, in some cases, an applicant may arbitrarily select specific terms. Then, the applicant will provide the meaning of the terms in the description of exemplary embodiments. Accordingly, It will be understood that the terms, used herein, should be interpreted as having a meaning that is consistent with their meaning in the context of the relevant art and will not be interpreted in an idealized or overly formal sense unless expressly so defined herein.

It will be further understood that the terms "comprises," "comprising," "includes," and/or "including," when used herein, specify the presence of components, but do not preclude the presence or addition of one or more other components, unless otherwise specified. Additionally, terms used herein, such as 'unit' or 'module', mean entities for processing at least one function or operation. These entities may be implemented by hardware, software, or a combination of hardware and software.

The exemplary embodiments will now be described more fully with reference to the accompanying drawings. The exemplary embodiments may, however, be embodied in many different forms and should not be construed as being limited to the exemplary embodiments set forth herein. In the description, certain detailed explanations of the related art are omitted when it is deemed that they may unnecessarily obscure the essence of the exemplary embodiments. Like numbers refer to like elements throughout the description of the figures.

FIG. 1 is a diagram for describing a method in which a relay device 100 relays data between a plurality of communication devices, according to an exemplary embodiment.

Referring to FIG. 1, the relay device 100 may relay data between a plurality of communication devices.

A first communication device 200a may request the relay device 100 to transmit the data to a second communication device. The relay device 100 may forward the data received from the first communication device 200a to a second communication device 200b.

According to exemplary embodiments, the first communication device 200a may receive a user input that selects the data that is to be transmitted and the second communication device may request the relay device 100 to transmit the selected data to the selected second communication device 200b. In this case, the first communication device 200a may display a list of communication devices connectable to the relay device 100 and receives a user input that selects one communication device from the list, thereby receiving the user input that selects the second communication device 200b.

The communication devices connectable to the relay device 100 may be communication devices that have been connected to the relay device 100 to store connection information. For example, the communication devices connectable to the relay device 100 may include communication devices that are currently connected to the relay device 100 and communication devices that have been connected in the past to the relay device 100.

Connection information may mean information for setting a short distance communication connection. For example, the communication information may include a BLUETOOTH address (for example, a MAC address) of a device for BLUETOOTH communication and a BLUETOOTH link key that is authentication information generated when pairing is performed but is not limited thereto. The short distance communication connection may include a BLUETOOTH connection, a WI-FI direct connection, etc. but is not limited thereto.

Upon receiving a data transmission request from the first communication device 200a, the relay device 100 may transmit, to the second communication device 200b, a confirmation request to confirm whether to receive the data from the first communication device 200a

Upon receiving, from the second communication device 200b, an acceptance response to accept that the second communication device 200b receives the data from the first communication device 200a, the relay device 100 may receive the data from the first communication device 200a and may transmit the data to the second communication device 200b.

Throughout the specification, determining that data is shared between the first communication device 200a and the second communication device 200b may be referred to as an association between communication devices. According to exemplary embodiments, a process of transmitting, to the second communication device 200b, the confirmation request to confirm whether to receive the data from the first communication device 200a may be omitted.

When an association between the first communication device 200a and the second communication device 200b is established, the relay device 100 may receive the data from the first communication device 200a and may forward the received data to the second communication device 200b.

In this regard, in a case where the short distance communication connection is not established between the first communication device 200a and the second communication device 200b, the relay device 100 may store the data received from the first communication device 200a, and then, when the short distance communication connection is established between the first communication device 200a and the second communication device 200b, may transmit the stored data to the second communication device 200b.

Figure 2:
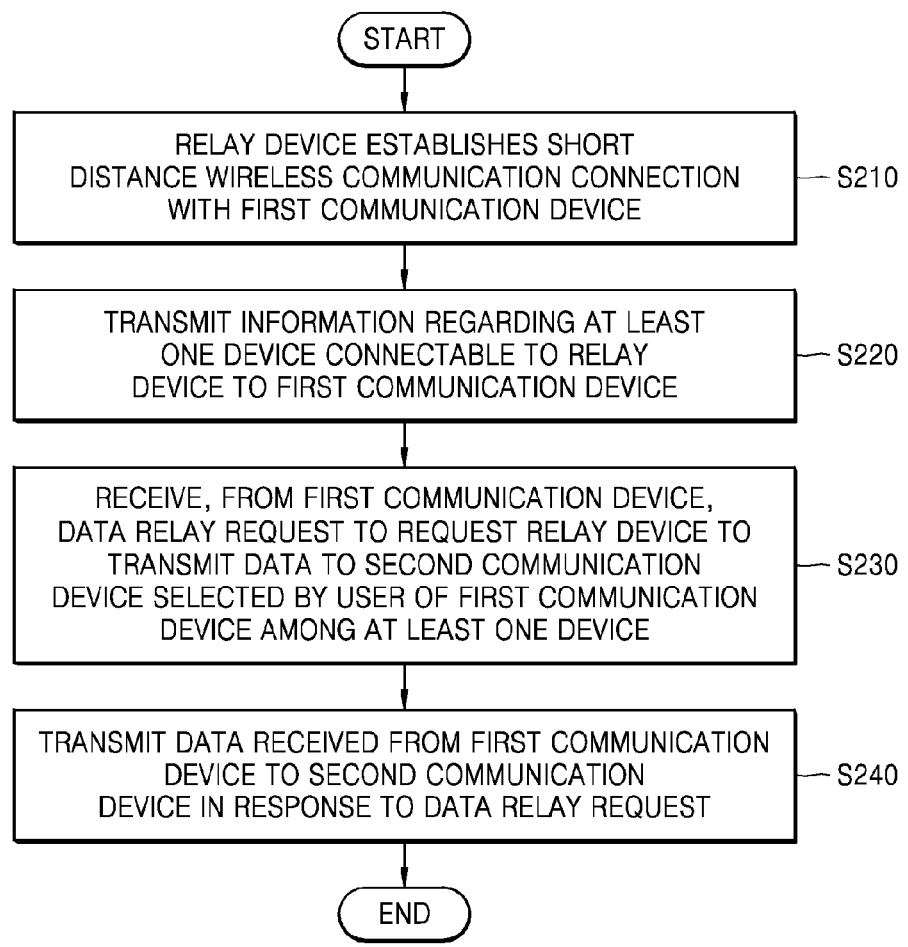
FIG. 2 is a flowchart of a method in which a relay device relays data between a plurality of communication devices, according to an exemplary embodiment.

FIG. 2 is a flowchart of a method in which the relay device 100 relays data between a plurality of communication devices, according to an exemplary embodiment.

In operation S210, the relay device 100 may establish a short distance wireless communication connection with the first communication device 200a.

For example, the relay device 100 and the first communication device 200a may establish a BLUETOOTH communication connection.

For example, when the relay device 100 and the first communication device 200a are not paired, the relay device 100 may search for a BLUETOOTH device around the relay device 100 to locate the first communication device 200a, may be paired with the first communication device 200a, and may establish a BLUETOOTH communication connection with the first communication device 200a.

A pairing process may be performed as follows. First, a master device may search for a slave device around the master device. In this case, the master device may receive product information from the slave device that allows the master device to search for the slave device. The product information may include a BLUETOOTH device (BD) address, a product name, profile information, etc.

A profile may be a specification that defines a use of BLUETOOTH used in a highest application. The profile may include a cordless telephony profile, an intercom profile, a serial port profile, a headset profile, a dial-up networking profile, a fax profile, a LAN access profile, an object push profile, a file transfer profile, a synchronization profile, etc.

The master device may display a list of a plurality of found slave devices and may receive a user input that selects one communication device from the list. The master device may request pairing from the selected slave device. Upon receiving a pairing request from the master device, the slave device may receive user authentication information (for example, a PIN code) from a user through a user interface and may transmit the received user authentication information to the master device. Upon receiving the user authentication information from the slave device, the master device may compare previously stored user authentication information with the received user authentication information to authenticate the slave device.

When the slave device is authenticated, the master device may generate a link key based on the BD address of the slave device and may store the generated link key. The master device and the slave device may establish the BLUETOOTH communication connection therebetween based on the stored link key.

Accordingly, the master device and the slave device that have paired once may establish a BLUETOOTH connection using a previously stored BD address and link key at a next connection without the pairing process. For example, when the relay device 100 and the first communication device 200a are paired, the relay device 100 may immediately establish the short distance wireless communication connection with the first communication device 200a using the BD address and the link key that are previously stored in the relay device 100.

Throughout the specification, a pairing state of two devices may mean a state where two devices may store BD addresses of each other, may share a link key that is to be used to authenticate each other, and may establish BLUETOOTH communication channels that are encrypted to each other based on the shared link key. A state where the BLUETOOTH communication connection is established between two devices may mean a state where the BLUETOOTH communication channel (for example, RFCOMM channels) may be established between two devices so that two devices may transmit data to each other.

Throughout the specification, when two devices are paired, one of the two devices may be referred to as a pairing device of the other one.

In operation S220, the relay device 100 may transmit information regarding at least one device connectable to the relay device 100 to the first communication device 200a.

The at least one device connectable to the relay device 100 may be paired with the relay device 100 so that the at least one device may include a communication device that stores connection information in the relay device 100. The connection information may include at least one of a BD address of the communication device and a link key but is not limited thereto.

The information regarding the at least one device may include a device name of the at least one device, BLUETOOTH profile information, and information indicating whether the short distance communication connection is currently established between the relay device 100 and the at least one device.

In operation S230, the relay device 100 may receive, from the first communication device 200a, a data relay request to request the relay device 100 to transmit data to the second communication device 200b selected by a user of the first communication device 200a among the at least one device.

For example, the first communication device 200a may display information regarding a communication device connectable to the relay device 100. For example, the first communication device 200a may display a device name of the communication device. The first communication device 200a may display a function of the communication device based on BLUETOOTH profile information. The first communication device 200a may display whether the short distance communication connection is currently established between the first communication device 200a and the relay device 100.

The first communication device 200a may receive a user input that selects the second communication device 200b from a list of displayed at least one communication device and may transmit the data relay request to request the relay device 100 to transmit the data to the selected second communication device 200b.

In operation S240, the relay device 100 may transmit the data received from the first communication device 200a to the second communication device 200b in response to the data relay request.

Upon receiving the data from the first communication device 200a after receiving the data relay request from the first communication device 200a, the relay device 100 may transmit the received data to the second communication device 200b.

According to exemplary embodiments, upon receiving the data relay request from the first communication device 200a, the relay device 100 may transmit, to the second communication device 200b, a data receiving request to request the second communication device 200b to receive the data from the first communication device 200a and may determine whether to transmit the data received from the first communication device 200a to the second communication device 200b based on response information received from the second communication device 200b.

According to exemplary embodiments, upon receiving the data relay request from the first communication device 200a, the relay device 100 may determine whether the short distance wireless communication connection is established between the second communication device 200b and the relay device 100, and, if the short distance wireless communication connection is not established between the second communication device 200b and the relay device 100, may store the data received from the first communication device 200a in the relay device 100.

After storing the data received from the first communication device 200a, when the second communication device 200b enters a short distance wireless communication connection range of the relay device 100 again or when a BLUETOOTH function is performed by a user input, the relay device 100 may establish the short distance wireless communication connection between the second communication device 200b and the relay device 100.

In this case, when the short distance wireless communication connection is established between the second communication device 200b and the relay device 100, the relay device 100 may display identification information of the data stored in the relay device 100. For example, the relay device 100 may display a confirmation window for confirming whether to transmit the stored data to the second communication device 200b.

When the short distance wireless communication connection is established between the second communication device 200b and the relay device 100, the relay device 100 may transmit the stored data to the second communication device 200b.

Figure 3A:
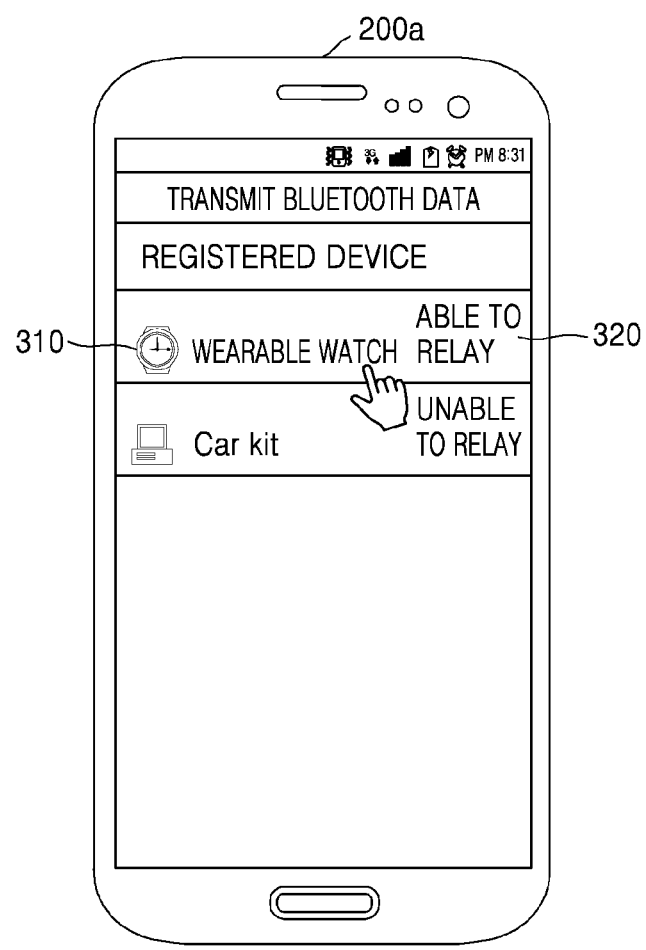
FIGS. 3A through 3C are diagrams for describing a method in which a first communication device transmits data to a second communication device through a relay device when the second communication device is connected to the relay device, according to an exemplary embodiment.
Figure 3B:
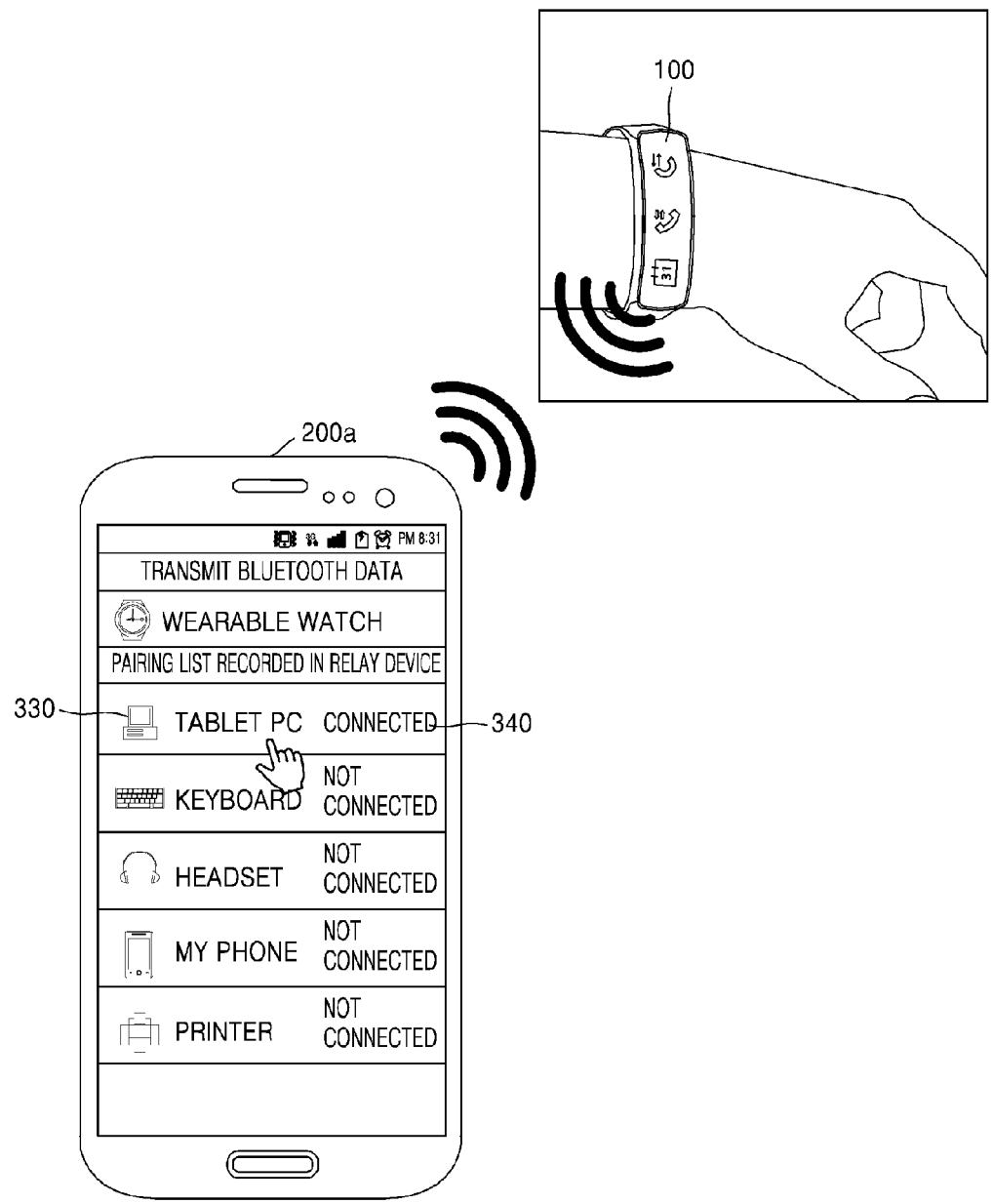
Figure 3C:
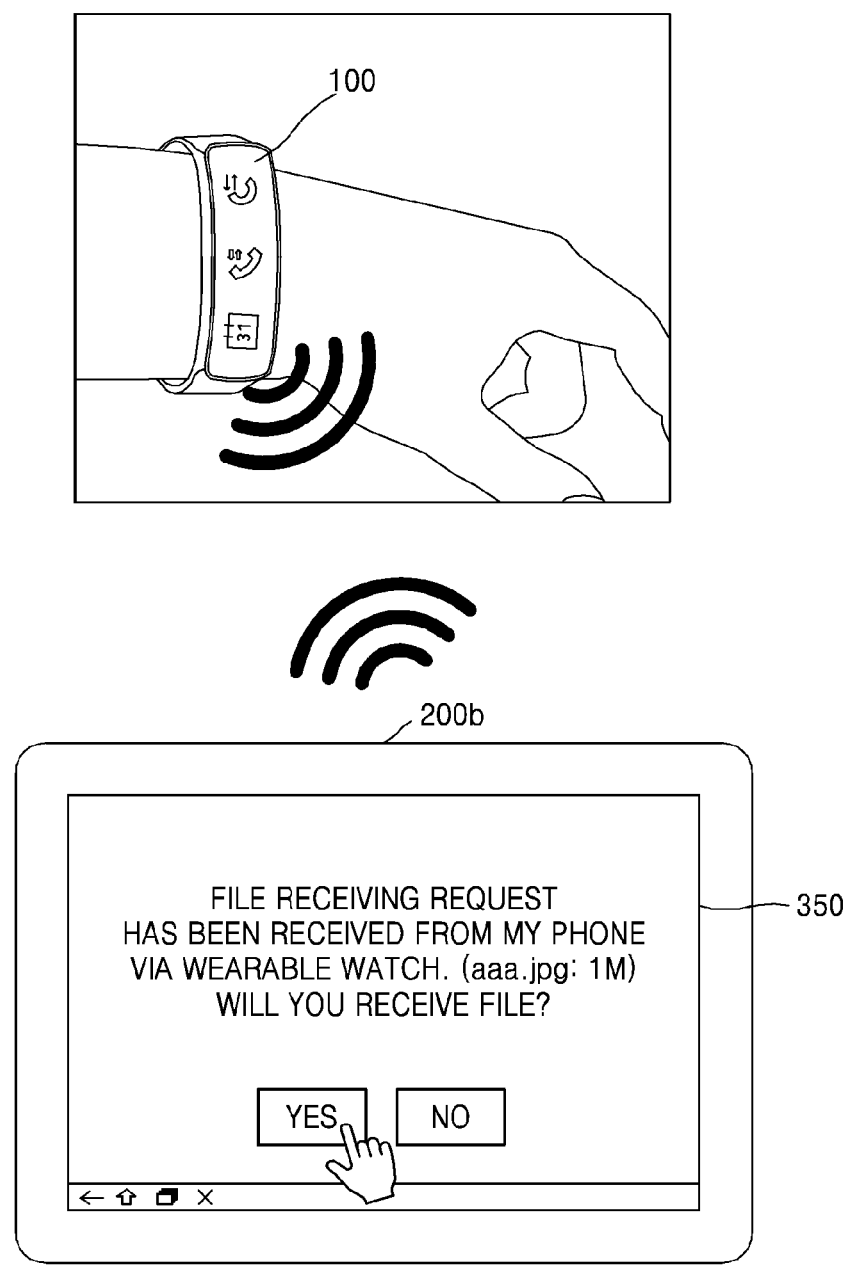

FIGS. 3A through 3C are diagrams for describing a method in which the first communication device 200a transmits data to the second communication device 200b through the relay device 100 when the second communication device 200b is connected to the relay device 100, according to an exemplary embodiment.

Referring to FIG. 3A, the first communication device 200a may receive a user input that selects the relay device 100.

For example, the first communication device 200a may select data that is to be transmitted and may receive the user input used to transmit the selected data to another device through Bluetooth.

When the first communication device 200a receives the user input used to transmit the data, the first communication device 200a may display a list of pairing devices that are registered in the first communication device 200a.

As shown in FIG. 3A, when a wireless communication connection is established between the first communication device 200a and a watch device, the first communication device 200a may display identification information 310 of the watch device. In this case, the first communication device 200a may display a text 320 indicating that the watch device operates as the relay device 100. Whether the watch device operates as the relay device 100 may be received as BLUETOOTH profile information of the relay device 100 from the relay device 100 when the first communication device 200a and the relay device 100 are paired.

Referring to FIG. 3B, when the first communication device 200a receives the user input used to select the watch device that is the relay device 100, the first communication device 200a may display a list of pairing devices that are registered in the relay device 100.

For example, upon receiving the user input that selects the relay device 100, the first communication device 200a may request the list of pairing devices that are registered in the relay device 100 from the relay device 100. Upon receiving a request for the list of pairing devices from the first communication device 200a, the relay device 100 may transmit the list of pairing devices that are registered in the relay device 100 to the first communication device 200a.

The list of pairing devices that are registered in the relay device 100 may include a list of communication devices with which the relay device 100 currently has a wireless communication connection, and a list of communication devices with which the relay device 100 does not currently have a wireless communication connection but with which the relay device 100 has been paired in the past.

The relay device 100 may transmit information regarding the pairing devices. The information regarding the pairing devices may include identification information of the pairing devices, a BLUETOOTH profile, storable capacity, whether the wireless communication connection is established between the pairing devices and the relay device 100, etc. but is not limited thereto.

Upon receiving the information regarding the pairing devices from the relay device 100, the first communication device 200a may display the received information regarding the pairing devices. In this case, the first communication device 200a may display an icon 330 indicating a function of each pairing device, information 340 indicating whether the wireless communication connection is currently established between each pairing device and the relay device 100, etc. in response to identification information of each pairing device. The function of each pairing device may be obtained from the Bluetooth profile of each pairing device.

Upon receiving a user input that selects the second communication device 200b among the displayed list of pairing devices, the first communication device 200a may request the relay device 100 to transmit data to the selected second communication device 200b. In this case, the first communication device 200a may transmit identification information of the data that is to be transmitted, the size of the data, and the type of the data and identification information of the selected second communication device 200b to the relay device 100.

Referring to FIG. 3C, upon receiving a data relay request from the first communication device 200a, the relay device 100 may determine whether the wireless communication connection is established between the second communication device 200b and the relay device 100. When the wireless communication connection is established between the second communication device 200b and the relay device 100, the relay device 100 may transmit a data receiving request, to the second communication device 200b, to request the second communication device 200b to receive the data from the first communication device 200a, and may determine whether to transmit the data received from the first communication device 200a to the second communication device 200b based on response information received from the second communication device 200b.

The data receiving request may include identification information of the data that is to be transmitted, the size, and the type and information regarding a location in which original data is stored.

Upon receiving the data receiving request from the relay device 100, the second communication device 200b may display a text indicating that the data receiving request is received from the relay device 100 and a confirmation window for selecting whether to receive requested data.

According to exemplary embodiments, the second communication device 200b may display the text indicating that the data receiving request is received from the first communication device 200a and the confirmation window for selecting whether to receive requested data through the relay device 100 based on the information regarding the location in which original data is stored.

Upon receiving a user input that accepts the data receiving request, the second communication device 200b may transmit information indicating that the data receiving request is accepted to the relay device 100.

Upon receiving the information indicating that the data receiving request is accepted from the second communication device 200b, the relay device 100 may transmit information indicating that an association is established between the first communication device 200a and the second communication device 200b to the first communication device 200a.

Upon receiving the information indicating that the association is established from the relay device 100, the first communication device 200a may transmit the data to the relay device 100, and the relay device 100 may transmit the received data to the second communication device 200b.

Figure 4:
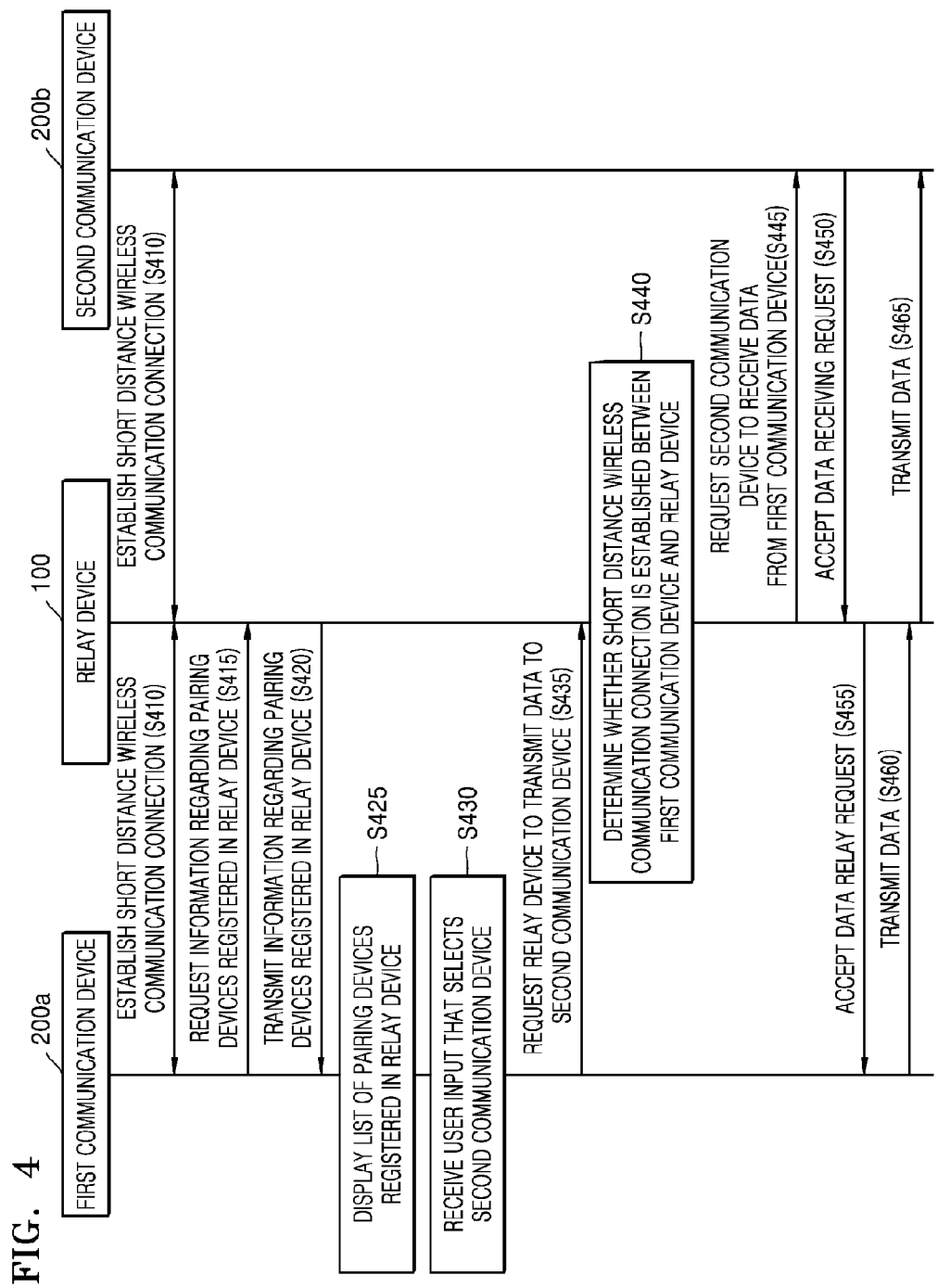
FIG. 4 is a flowchart of a method in which a first communication device transmits data to a second communication device through a relay device when the second communication device is connected to the relay device, according to an exemplary embodiment.

FIG. 4 is a flowchart of a method in which the first communication device 200a transmits data to the second communication device 200b through the relay device 100 when the second communication device 200b is connected to the relay device 100, according to an exemplary embodiment.

In operation S410, the relay device 100 may establish a short distance wireless communication connection between the first communication device 200a and the second communication device 200b.

In operation S415, the first communication device 200a may request information regarding pairing devices registered in the relay device 100 from the relay device 100.

For example, upon receiving a user input that transmits data to the relay device 100, the first communication device 200a may request the information regarding pairing devices registered in the relay device 100 from the relay device 100. According to exemplary embodiments, the first communication device 200a may request the information regarding pairing devices registered in the relay device 100 from the relay device 100 on a regular basis.

In operation S420, the relay device 100 may transmit the information regarding pairing devices registered in the relay device 100 to the first communication device 200a.

The information regarding pairing devices may include identification information of the pairing devices, a BLUETOOTH profile, storable capacity, whether a wireless communication connection is established between the pairing devices and the relay device 100, etc. but is not limited thereto.

According to exemplary embodiments, although there is no request of the first communication device 200a, the relay device 100 may transmit the information regarding pairing devices registered in the relay device 100 to communication devices between which the wireless communication connection is established on a regular basis.

In operation S425, the first communication device 200a may display a list of the pairing devices registered in the relay device 100.

The first communication device 200a may display a function of each pairing device, information indicating whether the wireless communication connection is currently established between each pairing device and the relay device 100, etc. in response to identification information of each pairing device.

In operation S430, the first communication device 200a may receive a user input that selects the second communication device 200b.

In operation S435, the first communication device 200a may request the relay device 100 to transmit data to the second communication device 200b.

In this case, the first communication device 200a may transmit information regarding the data that is to be transmitted and identification information of the second communication device 200b. The first communication device 200a may transmit information regarding a function that needs to be performed on the data by the second communication device 200b. For example, when the second communication device 200b is a device supporting various types of BLUETOOTH profiles, the first communication device 200a may transmit information regarding a BLUETOOTH profile that needs to be performed on the data by the second communication device 200b.

In operation S440, the relay device 100 may determine whether the short distance wireless communication connection is established between the first communication device 200a and the relay device 100.

In operation S445, the relay device 100 may request the second communication device 200b to receive the data from the first communication device 200a.

In this case, the relay device 100 may transmit identification information of the first communication device 200a, identification information of the data, a type, size, etc. to the second communication device 200b.

In operation S450, the second communication device 200b may transmit information indicating that a data receiving request is accepted to the relay device 100.

For example, the second communication device 200b may display a confirmation window for confirming whether to receive the data from the first communication device 200a based on the data receiving request received from the relay device 100. The second communication device 200b may receive a user input that accepts a data transmission through the confirmation window.

According to exemplary embodiments, operations S445 and S450 may be omitted. For example, when the second communication device 200b is a headset or a printer, the relay device 100 may not confirm whether the second communication device 200b receives the data from the first communication device 200a and may transmit the data received from the first communication device 200a to the second communication device 200b.

In operation S455, the relay device 100 may transmit information indicating that a data relay request is accepted to the first communication device 200a.

In operation S460, the first communication device 200a may transmit the data to the relay device 100.

In operation S465, the relay device 100 may transmit the data to the second communication device 200b.

The second communication device 200b may store the data received from the relay device 100. According to exemplary embodiments, the second communication device 200b may process the received data according to the BLUETOOTH profile. For example, the second communication device 200b may decode the received data to play music or may print the received data.

Figure 5:
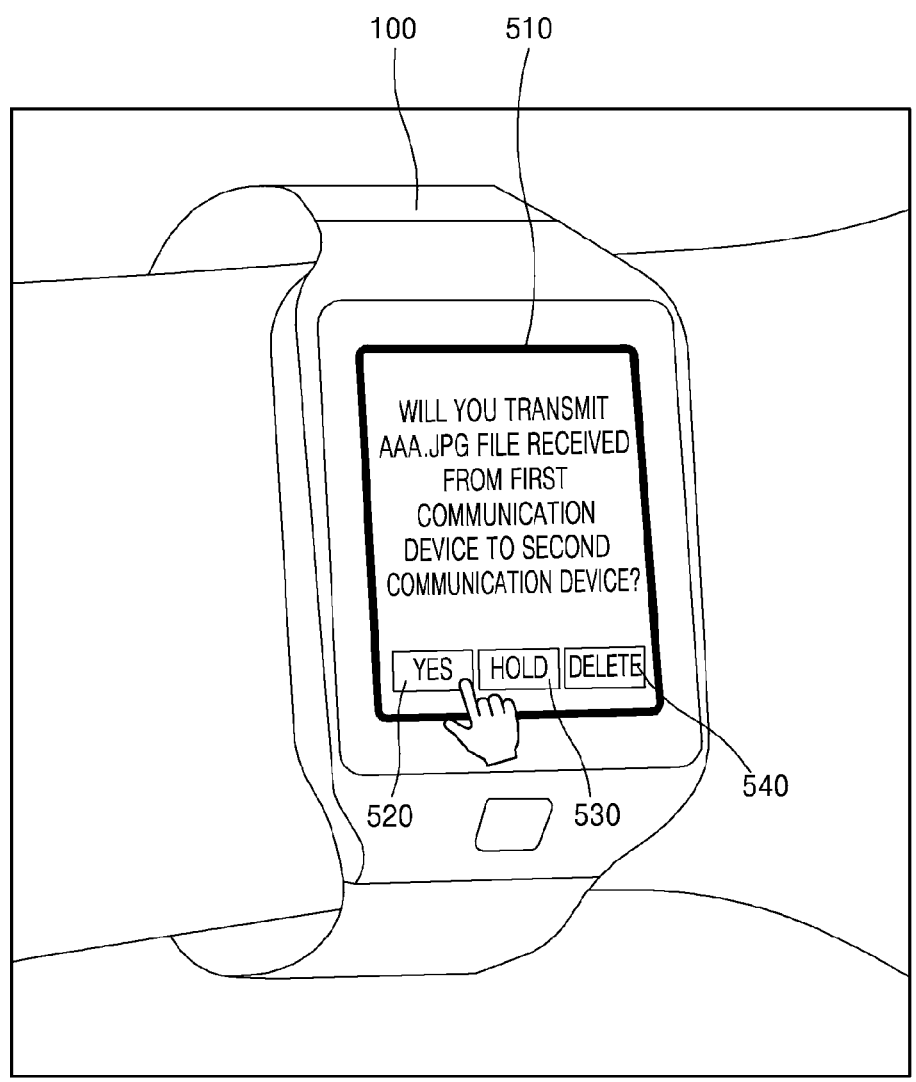
FIG. 5 is a diagram for describing a method in which a first communication device transmits data to a second communication device through a relay device when a short distance wireless communication connection is not established between the second communication device and the relay device, according to an exemplary embodiment.

FIG. 5 is a diagram for describing a method in which the first communication device 200a transmits data to the second communication device 200b through the relay device 100 when a short distance wireless communication connection is not established between the second communication device 200b and the relay device 100, according to an exemplary embodiment.

Referring to FIG. 5, if the short distance wireless communication connection is not established between the second communication device 200b and the relay device 100, the relay device 100 may store data received from the first communication device 200a, and, when a wireless communication connection is established between the second communication device 200b and the relay device 100, may transmit the stored data to the second communication device 200b.

Upon receiving a data relay request from the first communication device 200a, the relay device 100 may determine whether the wireless communication connection is established between the second communication device 200b and the relay device 100. When the second communication device 200b does not perform a BLUETOOTH communication function according to a setup of a user or is located beyond a range of the short distance wireless communication connection of the relay device 100, the wireless communication connection may not be established between the second communication device 200b and the relay device 100.

When the wireless communication connection is not established between the second communication device 200b and the relay device 100, the relay device 100 may transmit information indicating that the data relay request is accepted to the first communication device 200a.

Upon receiving the information indicating that the data relay request is accepted from the relay device 100, the first communication device 200a may transmit the data to the relay device 100. The relay device 100 may store the received data according to identification information of the second communication device 200b.

After storing the received data, when the second communication device 200b performs the BLUETOOTH communication function according to the setup of the user or is located within the range of the short distance wireless communication connection of the relay device 100, the relay device 100 may establish the wireless communication connection with the second communication device 200b. In this case, the relay device 100 may establish the wireless communication connection with the second communication device 200b based on connection information of the second communication device 200b that is previously stored in the relay device 100. For example, the relay device 100 may identify the second communication device 200b using BD address information and a link key of the second communication device 200b that are previously stored in the relay device 100 and may automatically establish the wireless communication connection with the second communication device 200b without a user authentication.

When the wireless communication connection is established between the second communication device 200b and the relay device 100, the relay device 100 may transmit the stored data corresponding to the identification information of the second communication device 200b to the second communication device 200b.

According to exemplary embodiments, as shown in FIG. 5, when the second communication device 200b is connected to the relay device 100, the relay device 100 may display a confirmation window 510 for confirming whether to transmit the stored data to the second communication device 200b. In this case, the relay device 100 may display both the identification information of the second communication device 200b to which the data is transmitted and identification information of the data. The relay device 100 may display, on the confirmation window 510, a confirmation button 520 for transmitting the stored data to the second communication device 200b, a holding button 530 for holding off a transmission of the data, and a deletion button 540 for deleting the data.

Upon receiving a user input that selects the confirmation button 520 through the confirmation window 510, the relay device 100 may transmit a data receiving request that requests the second communication device 200b to receive the data. Upon receiving a user input that selects the deletion button 540, the relay device 100 may delete the stored data. Upon receiving a user input that selects the holding button 530, the relay device 100 may not delete the stored data, and when the relay device 100 is connected to the second communication device 200b again after the relay device 100 is disconnected from the second communication device 200b, may display the stored data again on the confirmation window 510.

Figure 6:
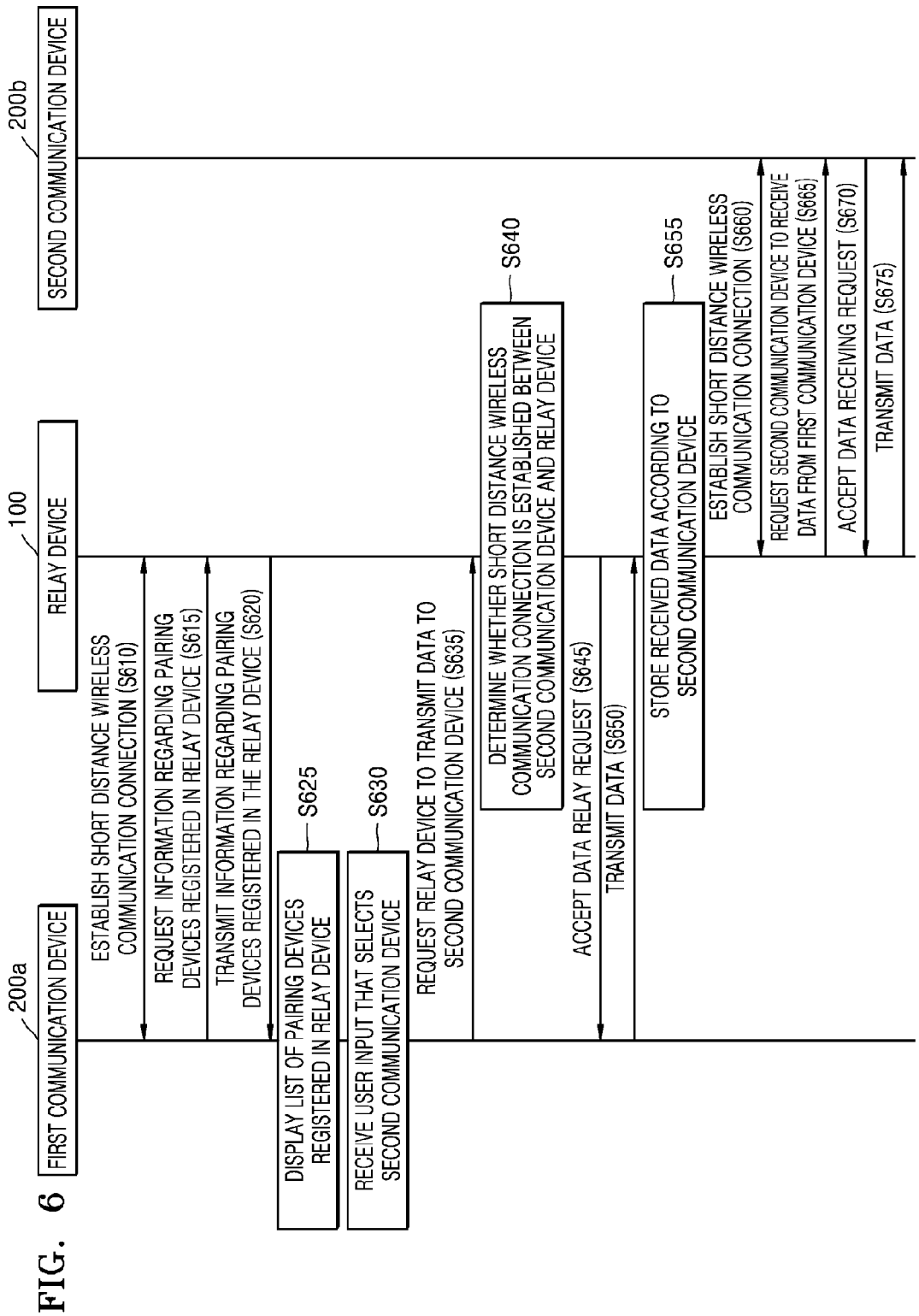
FIG. 6 is a flowchart of a method in which a first communication device transmits data to a second communication device through a relay device when a short distance wireless communication connection is not established between the second communication device and the relay device, according to an exemplary embodiment.

FIG. 6 is a flowchart of a method in which the first communication device 200a transmits data to the second communication device 200b through the relay device 100 when a short distance wireless communication connection is not established between the second communication device 200b and the relay device 100, according to an exemplary embodiment.

In operation S610, the relay device 100 may establish the short distance wireless communication connection with the first communication device 200a and the second communication device 200b. In operation S615, the first communication device 200a may request information regarding pairing devices registered in the relay device 100. In operation S620, the relay device 100 may transmit the information regarding pairing devices registered in the relay device 100 to the first communication device 200a. In operation S625, the first communication device 200a may display a list of the pairing devices registered in the relay device 100. In operation S630, the first communication device 200a may receive a user input that selects the second communication device 200b. In operation S635, the first communication device 200a may request the relay device 100 to transmit data to the second communication device 200b. In operation S640, the relay device 100 may determine whether the short distance wireless communication connection is established between the second communication device 200b and the relay device 100. Descriptions of operations S610 through S640 can be the same as those of corresponding operations S410 through S440 of FIG. 4.

If the short distance wireless communication connection is not established between the second communication device 200b and the relay device 100 in operation S640, then in operation S645, the relay device 100 may transmit information indicating that a data relay request is accepted to the first communication device 200a.

In operation S650, the first communication device 200a may transmit the data to the relay device 100.

In operation S655, the relay device 100 may store the received data. In some exemplary embodiments, the received data may be stored according to or the second communication device 200b, or in a manner indicating that the received data is associated with the second communication device 200b.

After storing the received data in operation S655, in operation S660, the relay device 100 may establish the short distance wireless communication connection with the second communication device 200b.

For example, when the second communication device 200b performs a BLUETOOTH communication function by a setup of a user or enters a short distance wireless communication connection range of the relay device 100, the relay device 100 may establish a distance wireless communication connection with the second communication device 200b. In this case, the relay device 100 may establish the wireless communication connection with the second communication device 200b based on connection information of the second communication device 200*b* that is previously stored in the relay device 100.

When the wireless communication connection is established between the second communication device 200*b* and the relay device 100 in operation S660, in operation S665, the relay device 100 may request the second communication device 200*b* to receive the data from the first communication device 200*a*. In operation S670, the second communication device 200*b* may transmit information indicating that a data receiving request is accepted to the relay device 100. In operation S675, the relay device 100 may transmit the stored data to the second communication device 200*b* according to the second communication device 200*b*. Operations S665 through S675 can be the same as those of corresponding operations S445, S450, and S465 of FIG. 4.

Figure 7:
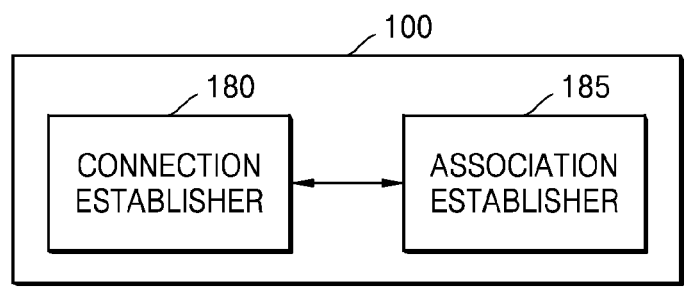
FIG. 7 is a block diagram of a relay device for transmitting data between communication devices connected to the relay device, according to an exemplary embodiment.

FIG. 7 is a block diagram of the relay device 100 for transmitting data between communication devices connected to the relay device 100, according to an exemplary embodiment.

As illustrated in FIG. 7, the relay device 100 for transmitting the data between the communication devices connected to the relay device 100 may include a connection establisher 180 and an association establisher 185. The connection establisher 180 and the association establisher 185 may be implemented as a hardware device (e.g., a general-purpose hardware processor such as a Digital Signal Processor (DSP) and a Field Programmable Gate Array (FPGA) or a special-purpose hardware processor such as a dedicated chip (e.g., a short-distance communication chip)) in the relay device 100.

Alternatively, the connection establisher 180 and the association establisher 185 may be implemented by software through computer programs. For example, the connection establishment unit 180 and the association establishment unit 185 may be implemented by various software modules for transmitting data between the communication devices in the relay device 100. For example, the various software modules may constitute a special-purpose application for transmitting data.

The relay device 100 may include smart wearable equipment (for example, a smart watch (e.g., a smart watch Gear), a pair of smart glasses or smart shoes), a smart phone, a PC, a tablet PC, a digital multimedia player, and a game console but is not limited thereto. The communication devices may include a computing device such as a smart phone, a PC, a tablet PC, a digital multimedia player, and a game console and a peripheral device such as a headset, a printer, a keyboard, a mouse, and a speaker.

The connection establisher 180 may establish a short-distance communication connection between the relay device 100 and at least two communication devices. The short-distance communication may include BLUETOOTH communication, WI-FI Direct communication, or any other types of suitable short-distance communications.

As an example, the connection establisher 180 may actively request establishing a corresponding short-distance communication connection with the at least two communication devices, respectively. The connection establisher 180 may establish a corresponding short-distance communication connection in response to a request for a short-distance communication connection from the communication devices. The connection establisher 180 may establish a short-distance communication connection with the at least two communication devices via a third party device (e.g., a server).

While the relay device 100 is communicating with a plurality of communication devices, the relay device 100 may communicate with individual associated communication devices by binding a communication packet to an address of a corresponding communication device and performing a corresponding packaging and parsing. Furthermore, the relay device 100 may process communication packets with respect to each communication device by assigning a corresponding thread according to the address of the communication device. However, the above manner is merely provided as an example. For example, those skilled in the art may realize the association and communication between the relay device 100 and the plurality of communication devices in an appropriate manner.

The association establisher 185 may establish an association between two communication devices among the at least two communication devices after the short-distance communication connection is established, so as to be prepared for data transmission between the two communication devices. In this case, the two communication devices may include the first communication device 200*a* and the second communication device 200*b*.

A corresponding control over the data transmission between the two communication devices may be obtained through the established association. In the case of a user possessing a plurality of communication devices, a centralized management on the data transmission between the communication devices may be achieved via the relay device 100 such as a smart watch.

The association establisher 185 may establish the association between the two communication devices by receiving from the first communication device 200*a*, a request signal to request transmission of data to the second communication device 200*b*, and transmitting the request signal to the second communication device 200*b*.

The association establisher 185 may further receive, from the second communication device 200*b*, a response signal to acknowledge receipt of data from the first communication device 200*a*, and transmit the received response signal to the first communication device 200*a*.

Furthermore, after the first communication device 200*a* and the second communication device 200*b* each establish the short-distance communication connection with the relay device 100, when the association establisher 185 receives from the first communication device 200*a*, a request signal to request transmission of data to the second communication device 200*b* while the second communication device 200*b* is located beyond a short-distance communication connection range of the relay device 100, the association establisher 185 may forward the request signal to the second communication device 200*b* upon the second communication device 200*b* entering the short-distance communication connection range of the relay device 100 again.

Thereafter, the association establisher 185 may receive, from the second communication device 200*b*, a response signal to acknowledge receipt of data from the first communication device 200*a*, and transmit the response signal to the first communication device 200*a*. Accordingly, the association prepared for data transmission may be efficiently established, even if the second communication device 200*b* is located beyond the short-distance communication range temporarily (e.g., the second communication device 200*b* is not around the user).

The association establisher 185 may establish the association between the first communication device 200*a* and the second communication device 200*b* by requesting the first communication device 200*a* to transmit data to the second communication device 200*b*. Specifically, the association establisher 185 may actively initiate the data transmission between the first communication device 200a and the second communication device 200b. In this case, the association establisher 185 may establish the association between the first communication device 200a and the second communication device 200b by requesting the first communication device 200a to transmit data to the second communication device 200b. For example, the data that is to be transmitted from the first communication device 200a to the second communication device 200b may be selected by the association establisher 185. The association establisher 185 may further inform the second communication device 200b that the first communication device 200a will transmit data to the second communication device 200b after the first communication device 200a accepts request from the association establisher 185.

The association establisher 185 may establish the association between the first communication device 200a and the second communication device 200b by pairing the first communication device 200a with the second communication device 200b. In the case of BLUETOOTH communication, compared to directly establishing a BLUETOOTH pairing between the first communication device 200a and the second communication device 200b, it may be quicker to establish a BLUETOOTH pairing between the first communication device 200a and the second communication device 200b via the association establisher 185 (which may for example be located in a smart watch Gear).

Figure 8:
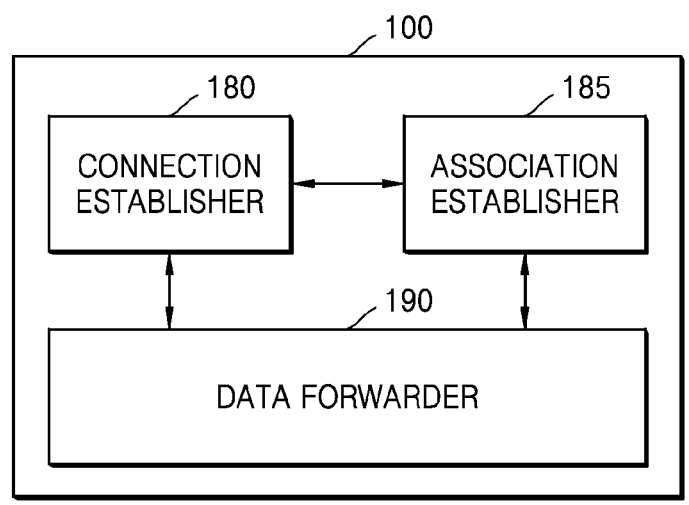
FIG. 8 is a block diagram of a relay device for transmitting data between communication devices connected to the relay device, according to another exemplary embodiment.

FIG. 8 is a block diagram of the relay device 100 for transmitting data between communication devices connected to the relay device 100, according to another exemplary embodiment.

In addition to the connection establisher 180 and the association establisher 185 illustrated in FIG. 7, the relay device 100 for transmitting data between communication devices connected to the relay device 100 illustrated in FIG. 8 may further include a data forwarder 190.

Specifically, the connection establisher 180 may establish a short-distance communication connection between the relay device 100 and at least two communication devices. The association establisher 185 may establish an association between two communication devices among the at least two communication devices after the short-distance communication connection is established, so as to be prepared for data transmission between the two communication devices. The two communication devices may include the first communication device 200a and the second communication device 200b. Moreover, the connection establisher 180 and the association establisher 185 may operate in accordance with the detailed description of the exemplary embodiment of FIG. 7 which will be omitted herein.

The data forwarder 190 may receive data from the first communication device 200a and forward the received data to the second communication device 200b, after the association is established by the association establisher 185 between the two communication devices.

The data forwarder 190 may directly forward the data received from the first communication device 200a to the second communication device 200b. The data forwarder 190 may further buffer the received data and forward the buffered data to the second communication device 200b.

For example, the data forwarder 190 may buffer the data received from the first communication device 200a, and forward the buffered data to the second communication device 200b upon the buffered data reaching a predetermined amount.

The data forwarder 190 may first buffer all of the data received from the first communication device 200a, and then forward all of the data to the second communication device 200b once. Accordingly, when the amount of data being transmitted is relatively large (e.g., when sending a video file), the number of times of the data being forwarded to the second communication device 200b may be reduced, and the transmission efficiency may be improved.

As another example, after the association is established between the first communication device 200a and the second communication device 200b, the data forwarder 190 may buffer the data received from the first communication device 200a in the case that the second communication device 200b is located beyond a short-distance communication connection range of the relay device 100, and forward the buffered data to the second communication device 200b upon the second communication device 200b entering the short-distance communication connection range of the relay device 100 again. Accordingly, the first communication device 200a may transmit the data to the second communication device 200b at any convenient time, without requiring the second communication device 200b to be located within the short-distance communication connection range of the relay device 100. In addition, the second communication device 200b may enter the short-distance communication connection range of the relay device 100 to receive the data at any convenient time.

For example, it may be assumed that the first communication device 200a is a mobile phone A, the second communication device 200b is a mobile phone B, and the relay device is a smart watch Gear. In the case that the mobile phone A and the mobile phone B each establish a BLUETOOTH communication connection with the smart watch Gear, the mobile phone A may transmit data to the smart watch Gear to be buffered at any convenient time, while the mobile phone B may or may not be located inside a BLUETOOTH communication connection range of the smart watch Gear. The smart watch Gear may forward the buffered data to the mobile phone B upon the mobile phone B entering the Bluetooth communication connection range of the smart watch Gear at any convenient time.

Figure 9:
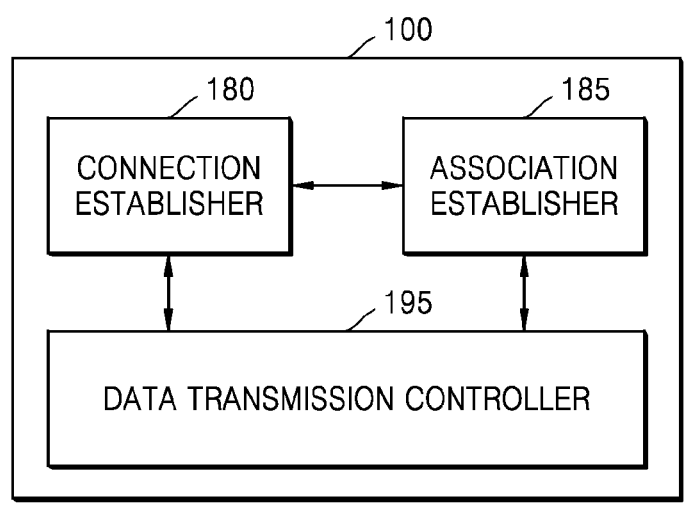
FIG. 9 is a block diagram of a relay device for transmitting data between communication devices connected to the relay device, according to another exemplary embodiment.

FIG. 9 is a block diagram of the relay device 100 for transmitting data between communication devices connected to the relay device 100, according to another exemplary embodiment. In addition to the connection establisher 180 and the association establisher 185 illustrated in FIG. 7, the relay device 100 for transmitting data between communication devices connected to the relay device 100 illustrated in FIG. 9 may further include a data transmission controller 195.

Specifically, the connection establisher 180 may establish a short-distance communication connection between the relay device 100 and at least two communication devices. The association establisher 185 may establish an association between two communication devices among the at least two communication devices after the short-distance communication connection is established, so as to be prepared for data transmission between the two communication devices. Herein, the two communication devices may include the first communication device 200a and the second communication device 200b. Moreover, the connection establisher 180 and the association establisher 185 may operate in accordance with the detailed description of the exemplary embodiment of FIG. 7 which will be omitted herein.

The data transmission controller 195 may select data to be transmitted to the second communication device 200b from the first communication device 200a and control the first communication device 200a to transmit the selected data to the second communication device 200b, after the association is established by the association establisher 195 between the two communication devices.

Further, the transmitted data may have be in the format of a file, and the data transmission controller 195 may select a file to be transmitted to the second communication device 200b from the first communication device 200a via a File Transfer Protocol (FTP). Accordingly, the relay device 100 may efficiently control the file transfer between the two communication devices.

Figure 10:
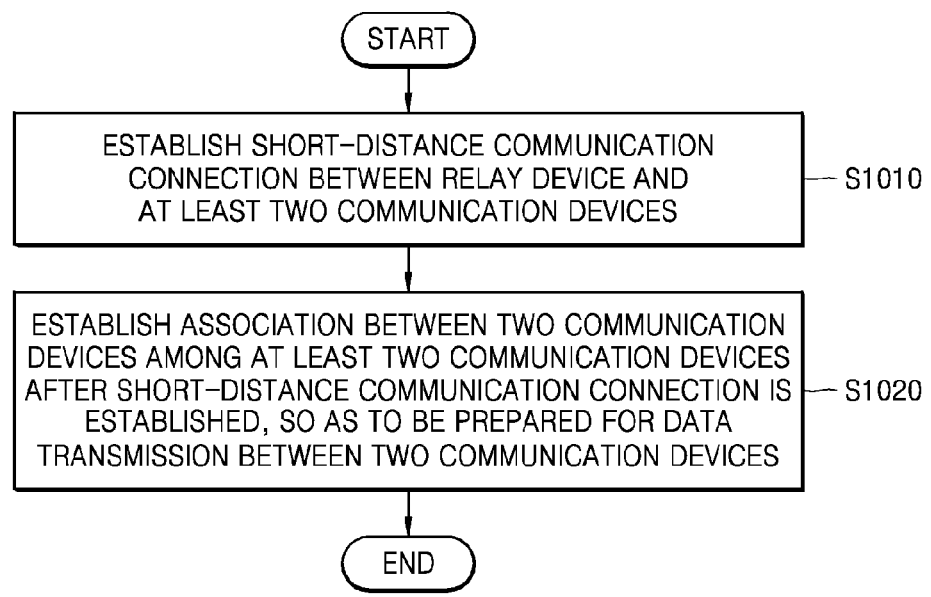
FIG. 10 is a flowchart of a method of transmitting data between communication devices connected to a relay device, according to an exemplary embodiment.

FIG. 10 is a flowchart of a method of transmitting data between communication devices connected to the relay device 100, according to an exemplary embodiment.

Herein, the relay device 100 may include a smart wearable device (for example, a smart watch (e.g., a smart watch Gear), a pair of smart glasses or smart shoes), a smart phone, a PC, a tablet PC, a digital multimedia player, and a game console. The communication devices may include a smart phone, a PC, a tablet PC, a digital multimedia player, and a game console. As an example, the method illustrated in FIG. 7 may be carried out by the device illustrated in FIG. 9, or be achieved completely based upon a computer program.

In operation S1010, a short-distance communication connection is established between the relay device 100 and at least two communication devices. Herein, short-distance communication may include BLUETOOTH communication, WI-FI direct communication, or any other types of suitable short-distance communications.

As an example, the relay device 100 may actively request establishing a corresponding short-distance communication connection with the at least two communication devices, respectively. The relay device 100 may establish a corresponding short-distance communication connection in response to a request for a short-distance communication connection from the communication devices. The relay device 100 may establish a short-distance communication connection with the at least two communication devices via a third party device (e.g., a server).

While the relay device 100 is communicating with a plurality of communication devices, the relay device 100 may communicate with individual associated communication devices by binding a communication packet to an address of a corresponding communication device and performing a corresponding packaging and parsing. Furthermore, the relay device 100 may specially process communication packets with respect to a specific communication device by assigning a corresponding thread according to the address of the communication device. However, the above manner is merely provided. As an example, those skilled in the art may realize the association and communication between the relay device 100 and the plurality of communication devices in any appropriate manner.

In operation S1020, an association between two communication devices among the at least two communication devices may be established after the short-distance communication connection is established, so as to be prepared for data transmission between the two communication devices. Herein, the two communication devices may include the first communication device 200a and the second communication device 200b.

In the above manner, a corresponding control over the data transmission between the two communication devices may be obtained through the established association. In particular, in the case of a user possessing a plurality of communication devices, a centralized management of the data transmission between the communication devices may be achieved via the relay device 100 such as a smart watch.

Alternatively, in operation S1020, the relay device 100 may receive from the first communication device 200a, a request signal to request transmission of data to the second communication device 200b, and transmit the request signal to the second communication device 200b.

The relay device 100 may receive a response signal to acknowledge receipt of data from the first communication device 200a, from the second communication device 200b, and transmit the response signal to the first communication device 200a.

Furthermore, after the first communication device 200a and the second communication device 200b each establish a short-distance communication connection with the relay device 100, the relay device 100 may receive from the first communication device 200a, a request signal to request transmission of data to the second communication device 200b in the case that the second communication device 200b is located beyond a short-distance communication connection range of the relay device 100, and forward the request signal to the second communication device 200b upon the second communication device 200b entering the short-distance communication connection range of the relay device 100 again.

Thereafter, the relay device 100 may receive, from the second communication device 200b, a response signal to acknowledge receipt of data from the first communication device 200a, and transmit the response signal to the first communication device 200a. In the above manner, the association prepared for data transmission may be established efficiently, even if the relay device 100 is located beyond the short-distance communication range temporarily (e.g., the relay device 100 is not around the user).

Alternatively, in operation S1020, the association between the first communication device 200a and the second communication device 200b may be established by the relay device 100 requesting the first communication device 200a to transmit data to the second communication device 200b. Specifically, the relay device 100 may actively initiate the data transmission between the first communication device 200a and the second communication device 200b. In this case, the relay device 100 may establish the association between the first communication device 200a and the second communication device 200b by requesting the first communication device 200a to transmit data to the second communication device 200b. Herein, as an example, the data may be selected by the relay device 100. The relay device 100 may further inform the second communication device 200b that the first communication device 200a will transmit data to the second communication device 200b after the first communication device 200a accepts the request from the relay device 100.

Alternatively, in operation S1020, the association may be established between the first communication device 200a and the second communication device 200b by pairing the first communication device 200a with the second communication device 200b. In the case of BLUETOOTH communication, compared to directly establishing BLUETOOTH pairing between the first communication device 200a and the second communication device 200b, it can be much quicker to establish the BLUETOOTH pairing between the first communication device 200a and the second communication device 200b through the relay device 100 (e.g., a smart watch Gear).

Figure 11:
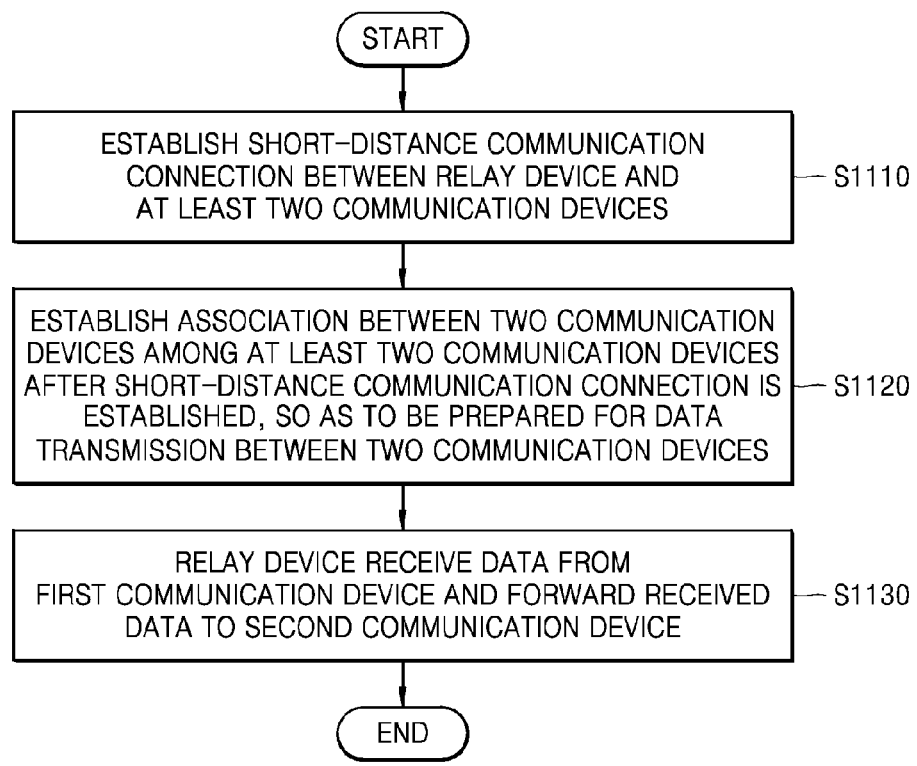
FIG. 11 is a flowchart of a method of transmitting data between communication devices connected to a relay device, according to another exemplary embodiment.

FIG. 11 is a flowchart of a method of transmitting data between communication devices connected to the relay device 100, according to another exemplary embodiment.

In operation S1100, a short-distance communication connection is established between the relay device 100 and at least two communication devices.

In operation S1120, an association between two communication devices among the at least two communication devices is established after the short-distance communication connection is established. Herein, the two communication devices may include the first communication device 200a and the second communication device 200b.

It should be understand that operations S1100 and S1120 may include the detailed operations performed in operations S1010 and S1020 in FIG. 10.

In operation S1130, the relay device 100 may receive data from the first communication device 200a and forward the received data to the second communication device 200b.

Herein, the relay device 100 may directly forward the data received from the first communication device 200a to the second communication device 200b. In another exemplary embodiment, the relay device 100 may buffer the received data and forward the buffered data to the second communication device 200b.

As for the above manner of forwarding data after being buffered, as an example, the relay device 100 may buffer the data received from the first communication device 200a, and forward the buffered data to the second communication device 200b upon the buffered data reaching a predetermined amount. In particular, the relay device 100 may first buffer all of the data received from the first communication device 200a, and then forward all of the data to the second communication device 200b once. In this way, when the amount of data being transmitted is relatively large (e.g., when sending a video file), the number of times of the data being forwarded to the second communication device 200b may be reduced, and the transmission efficiency may be improved.

As another example, after the association is established between the first communication device 200a and the second communication device 200b, the relay device 100 may buffer the data received from the first communication device 200a in the case that the second communication device 200b is located beyond a short-distance communication connection range of the relay device 100, and forward the buffered data to the second communication device 200b upon the second communication device 200b entering the short-distance communication connection range of the relay device 100 again. In the above manner, the first communication device 200a may transmit the data to the second communication device 200b at any convenient time, without requiring the second communication device 200b being located within the short-distance communication connection range of the relay device 100. In addition, the second communication device 200b may enter the short-distance communication connection range of the relay device 100 to receive the data at any convenient time.

For example, it may be assumed that the first communication device 200a is a mobile phone A, the second communication device 200b is a mobile phone B, and the relay device 100 is a smart watch Gear. In the case that the mobile phone A and the mobile phone B each establish a Bluetooth communication connection with the smart watch Gear, the mobile phone A may transmit data to the smart watch Gear to be buffered at any convenient time, while the mobile phone B may or may not be located inside a BLUETOOTH communication connection range of the smart watch Gear. The smart watch Gear may forward the buffered data to the mobile phone B upon the mobile phone B entering the BLUETOOTH communication connection range of the smart watch Gear at any convenient time.

Figure 12:
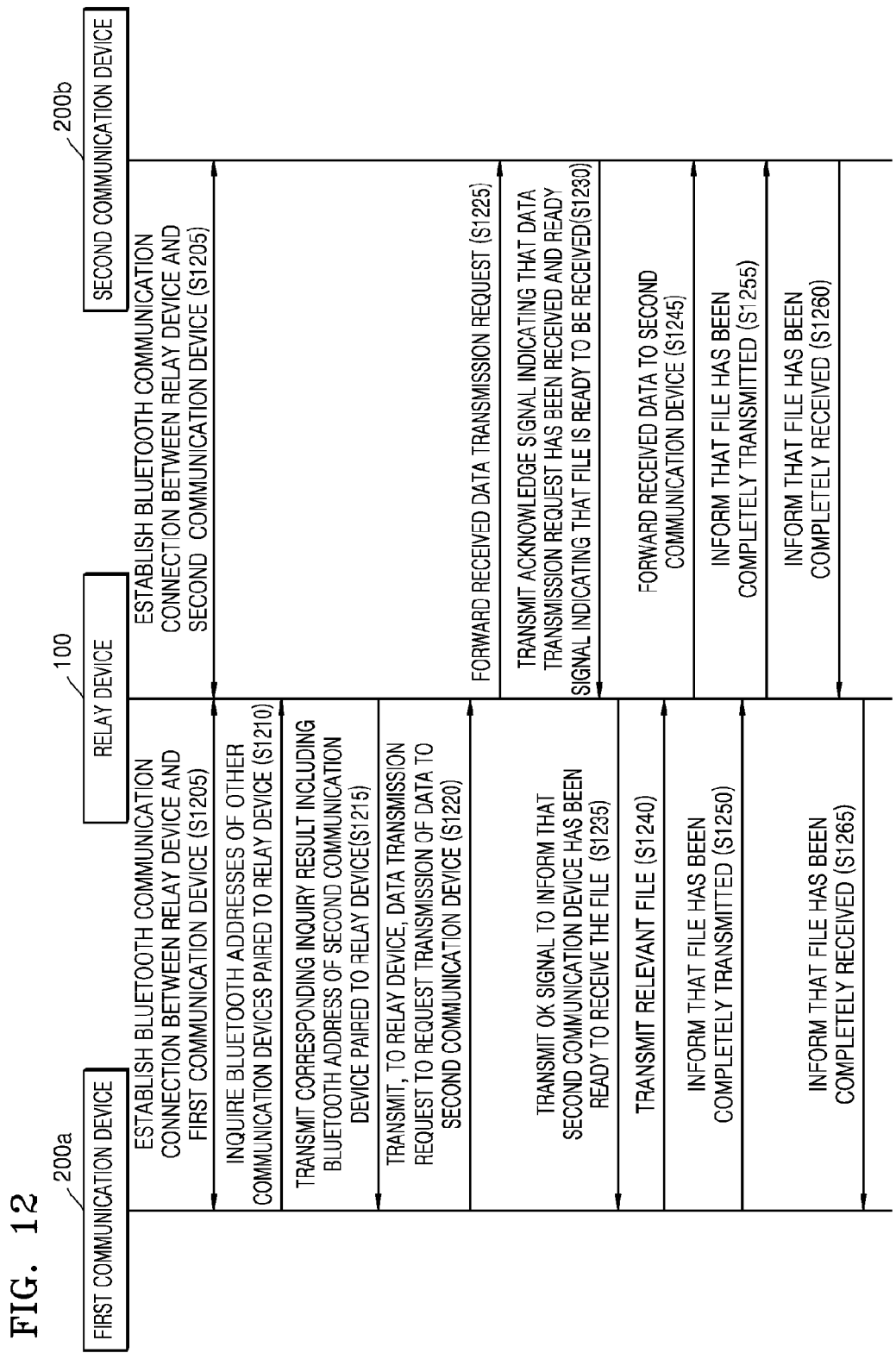
FIG. 12 illustrates an example of transmitting data between communication devices connected to a relay device, according to an exemplary embodiment.
Figure 13:
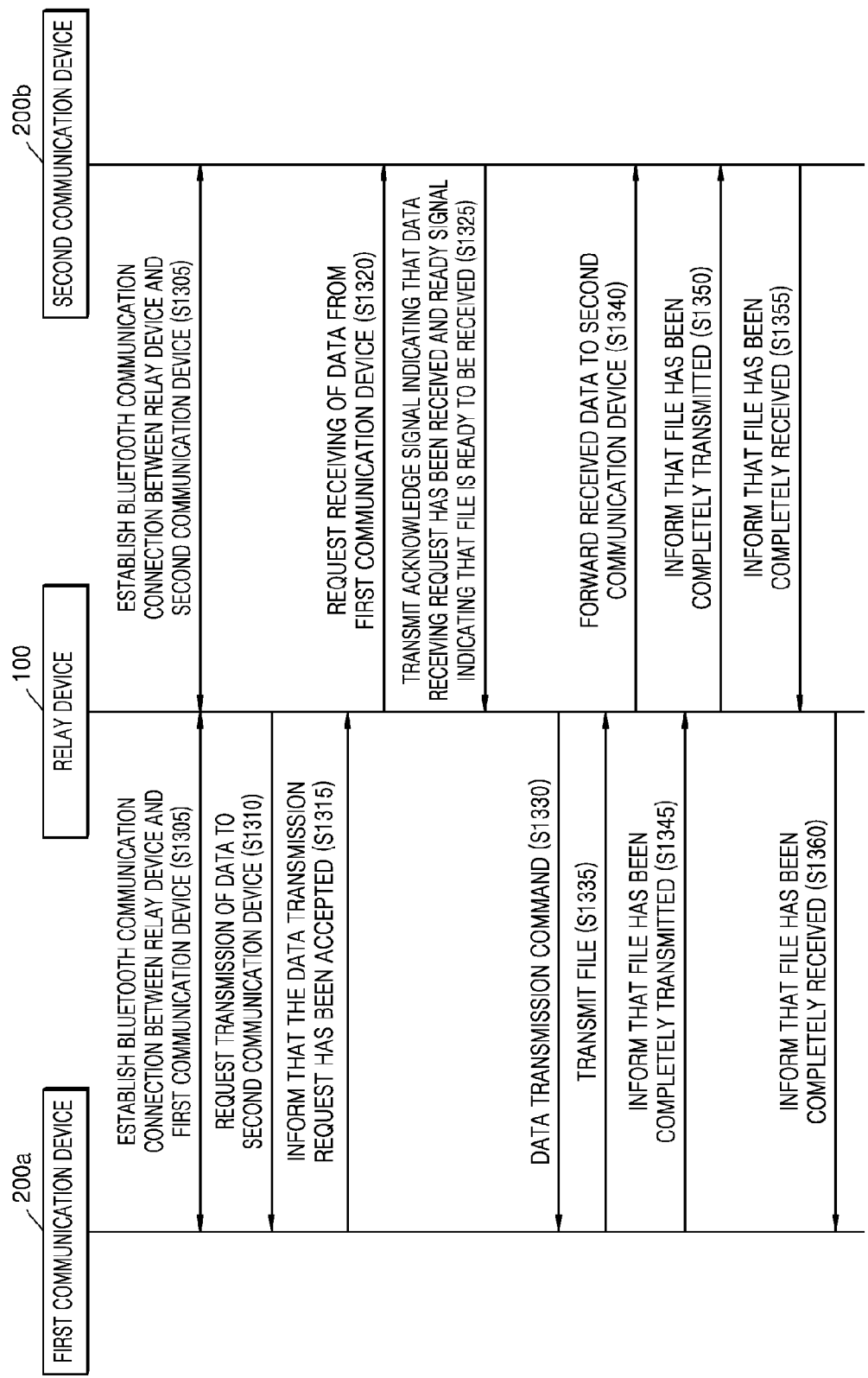
FIG. 13 illustrates an example of transmitting data between communication devices connected to a relay device, according to another exemplary embodiment.

FIGS. 12 and 13 are two examples of transmitting data between communication devices (i.e., the first communication device 200a and the second communication device 200b) connected to the relay device 100 according to an exemplary embodiment.

In the two examples, taking a file and a BLUETOOTH communication for example, the specific procedure of transmitting data between two communication devices which have a short distance communication connection with the relay device 100 will be set forth below. However, the present disclosure is not limited thereto.

The data transferred between the two communication devices may also be other types of non-file format data, and the short-distance communication may also be WI-FI direct communication or any other types of suitable short-distance communication. Moreover, in addition to the first communication device 200a and the second communication device 200b, there may be other communication devices connected to the relay device 100, and the FIGS. 12 and 13 merely illustrate two communication devices between which data transmission is enabled.

FIG. 12 illustrates an example of transmitting data between communication devices connected to the relay device 100, according to an exemplary embodiment.

Referring to FIG. 12, in operation S1205, a BLUETOOTH communication connection is established between the relay device 100 and the first communication device 200a and the second communication device 200b, respectively.

In operation S1210, the first communication device 200a may transmit to the relay device 100, an inquiry command to inquire BLUETOOTH addresses of other communication devices paired to the relay device 100.

In operation S1215, in response to the received inquiry command, the relay device 100 may transmit to the first communication device 200a, a corresponding inquiry result including a BLUETOOTH address of the second communication device 200b paired to the relay device 100.

In operation S1220, the first communication device 200a may transmit to the relay device 100, a data transmission request to request transmission of data to the second communication device 200b according to the received BLUETOOTH address of the second communication device.

In operation S1225, the relay device 100 may forward the received data transmission request to the second communication device 200b.

According to exemplary embodiments, before the data transmission request is forwarded by the relay device 100 to the second communication device 200b, the relay device 100 may transmit an awaiting command to the first communication device 200a to inform the first communication device 200a of awaiting a response to the data transmission request from the second communication device 200b in operation S1225.

Moreover, when the data transmission request is received from the first communication device 200a, if the second communication device 200b is located beyond a BLUETOOTH communication connection range of the relay device 100, the relay device 100 may not forward the data transmission request to the second communication device 200b until the second communication device 200b enters the BLUETOOTH communication connection range of the relay device 100 again in operation S1225.

After the data transmission request is received, if the second communication device 200b agrees to receive the file from the first communication device 200a, the second communication device 200b may transmit to the relay device 100, an acknowledge signal (i.e., an OK signal) indicating that the data transmission request has been received and a READY signal indicating that the file is ready to be received in operation S1230.

As an example, the second communication device 200b may firstly transmit the OK signal to the relay device 100, and then transmit the READY signal to the relay device 100 when relay device 200b is prepared to receive data.

In operation S1235, the relay device 100 may transmit to the first communication device 200a, the OK signal to inform that the second communication device 200b has been ready to receive the file.

Through operations S1205 to S1235, an association for data transmission may be established between the first communication device 200a and the second communication device 200b, so as to be prepared for data transmission between the two communication devices.

In operation S1240, the first communication device 200a may transmit the relevant file to the relay device 100.

In operation S1245, the relay device 100 may forward the data received from the first communication device 200a to the second communication device 200b.

For example, the relay device 100 may buffer the data received from the first communication device 200a, and forward the file to the second communication device 200.

As an example, the relay device 100 may buffer the data received from the first communication device 200a, and forward the buffered data to the second communication device 200b whenever the buffered data has reached a predetermined amount, until the entire file from the first communication device 200a has been transmitted to the second communication device 200b. In particular, the relay device 100 may firstly buffer the entire file received from the first communication device 200a, and then forward the entire file to the second communication device 200b once.

As another example, after the association is established between the first communication device 200a and the second communication device 200b, the relay device 100 may buffer the file received from the first communication device 200a in the case that the second communication device 200b is located beyond a short-distance communication connection range of the relay device 100, and forward the buffered file to the second communication device 200b upon the second communication device 200b entering the short-distance communication connection range of the relay device 100 again.

Additionally, the first communication device 200a and the second communication device 200b may be informed of the completion of the file transfer.

Specifically, in operation S1250, the first communication device 200a may inform the relay device 100 that the file has been completely transmitted.

In operation S1255, the relay device 100 may inform the second communication device 200b that the file has been completely transmitted.

In operation S1260, the second communication device 200b may inform the relay device 100 that the file has been completely received.

In operation S1265, the relay device 100 may inform the second communication device 200b that the file has been completely received.

FIG. 13 illustrates an example of transmitting data between communication devices connected to the relay device 100 according to another exemplary embodiment.

Referring to FIG. 13, in operation S1305, a BLUETOOTH communication connection may be established between the relay device 100 and the first communication device 200a and the second communication device 200b, respectively.

In operation S1310, the relay device 100 may transmit to the first communication device 200a, a data transmission request to request transmission of data to the second communication device 200b via the relay device 100.

Specifically, the relay device 100 may request the first communication device 200a to transmit files stored in the first communication device 200a to the second communication device 200b via the relay device 100 through the data transmission request.

For example, the relay device 100 may receive a list of the files stored in the first communication device 200a from the first communication device 200a. For example, the first communication device 200a and the relay device 100 may synchronize metadata information of the files stored in the first communication device 200a. A method of synchronizing metadata information of a file through BLUETOOTH communication may be defined as a BLUETOOTH profile. The metadata information of the file may include identification information of the file, a file name, a file type, and a file size, but is not limited thereto.

The relay device 100 may display the list of the files stored in the first communication device 200a based on the received metadata information of the files. Upon receiving a user input that selects one communication device from the list of the files, the relay device 100 may request the selected file from the first communication device 200a.

In operation S1315, the first communication device 200a may transmit to the relay device 100, an OK signal to inform that the data transmission request has been accepted by the first communication device 200a.

In operation S1320, the relay device 100 may request the second communication device 200b to receive data from the first communication device 200a.

In this case, the relay device 100 may transmit a BLUETOOTH address of the first communication device 200a and information regarding the data to the second communication device 200b.

In operation S1325, the second communication device 200b may transmit an acknowledge signal indicating that a data receiving request has been received and a READY signal indicating that the file is ready to be received to the relay device 100.

For example, after the data receiving request is received, if the second communication device 200b receives a user input that agrees to receive the file from the first communication device 200a, the second communication device 200b may transmit the acknowledge signal and the READY signal to the relay device 100.

In operation S1330, the relay device 100 may transmit to the first communication device 200a, a data transmission command to inform the first communication device 200a that the second communication device 200b is prepared to receive the file and instruct the first communication device 200a to transmit the file.

Through operations S1305 through S1330, an association for data transmission may be established between the first communication device 200a and the second communication device 200b, so as to be prepared for data transmission between the two communication devices.

Thereafter, in operation S1335, the first communication device 200a may transmit the relevant file to the relay device 100.

In operation S1340, the relay device 100 may forward the data received from the first communication device 200a to the second communication device 200b.

For example, the relay device 100 may buffer the data received from the first communication device 200a, and forward the received file to the second communication device 200b.

As an example, the relay device 200a may buffer the file received from the first communication device 200a, and forward the buffered data to the second communication device 200b whenever the buffered data has reached a predetermined amount, until the entire file from the first communication device 200a has been transmitted to the second communication device 200b. In particular, the relay device 100 may firstly buffer the entire file received from the first communication device 200a, and then forward the entire file to the second communication device 200b once.

As another example, after the association is established between the first communication device 200a and the second communication device 200b, the relay device 100 may buffer the file received from the first communication device 200a in the case that the second communication device 200b is located beyond a short-distance communication connection range of the relay device 100, and forward the buffered file to the second communication device 200b upon the second communication device 200b entering the short-distance communication connection range of the relay device 100 again.

Additionally, the first communication device 200a and the second communication device 200b may be informed of the completion of the file transfer.

Specifically, in operation S1345, the first communication device 200a may inform the relay device 100 that the file has been completely transmitted.

In operation S1350, the relay device 100 may inform the second communication device 200b that the file has been completely transmitted.

In operation S1355, the second communication device 200b may inform the relay device 100 that the file has been completely received.

In operation S1360, the relay device 100 may inform the first communication device 200a that the file has been completely received.

The examples of transmitting data between the first communication device 200a and the second communication device 200b via the relay device 100 have been described above with reference to FIGS. 12 and 13. However, the present disclosure is not limited to the above examples. For example, although the data transmission is requested by the relay device 100 or the communication device to transmit the data in FIGS. 12 and 13, it should be understood by those skilled in the art that the present disclosure is not limited thereto, and the case that data transmission is requested by the communication device to receive the data may also be applicable.

Figure 14:
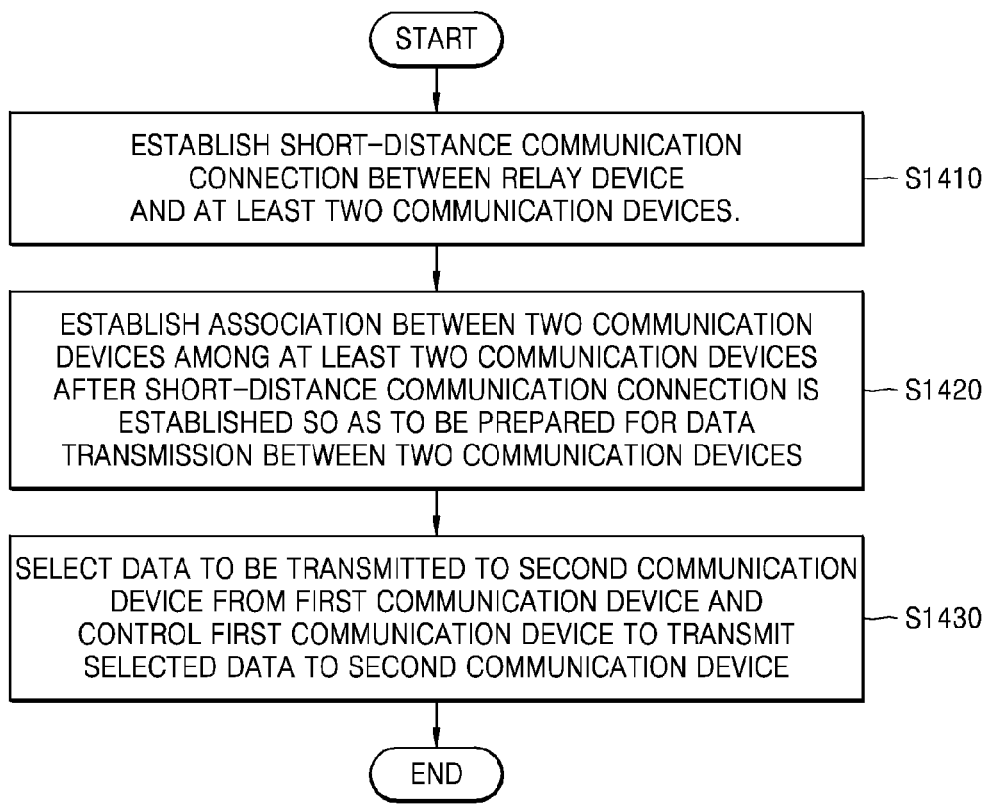
FIG. 14 is a flowchart of a method of transmitting data between communication devices connected to a relay device, according to another exemplary embodiment.

FIG. 14 illustrates a flow diagram of a method of transmitting data between communication devices connected to the relay device 100, according to another exemplary embodiment.

In operation S1410, a short-distance communication connection may be established between the relay device 100 and at least two communication devices.

In operation S1420, an association between two communication devices among the at least two communication devices may be established after the short-distance communication connection is established. Herein, the two communication devices may include the first communication device 200a and the second communication device 200b.

It should be understand that operations S1410 and S1420 may include the detailed operations performed in operations S1010 and S1020 in FIG. 10.

In operation S1430, the relay device 100 may receive a user input that selects data to be transmitted to the second communication device 200b from the first communication device 200a and control the first communication device 200a to transmit the selected data to the second communication device 200b.

Furthermore, the selected data be in the format of a file. Accordingly, in operation S1430, the relay device 100 may select a file to be transmitted to the second communication device 200b from the first communication device 200a via a File Transfer Protocol (FTP). In the above manner, the relay device 100 may efficiently control the file transfer between the two communication devices.

Figure 15:
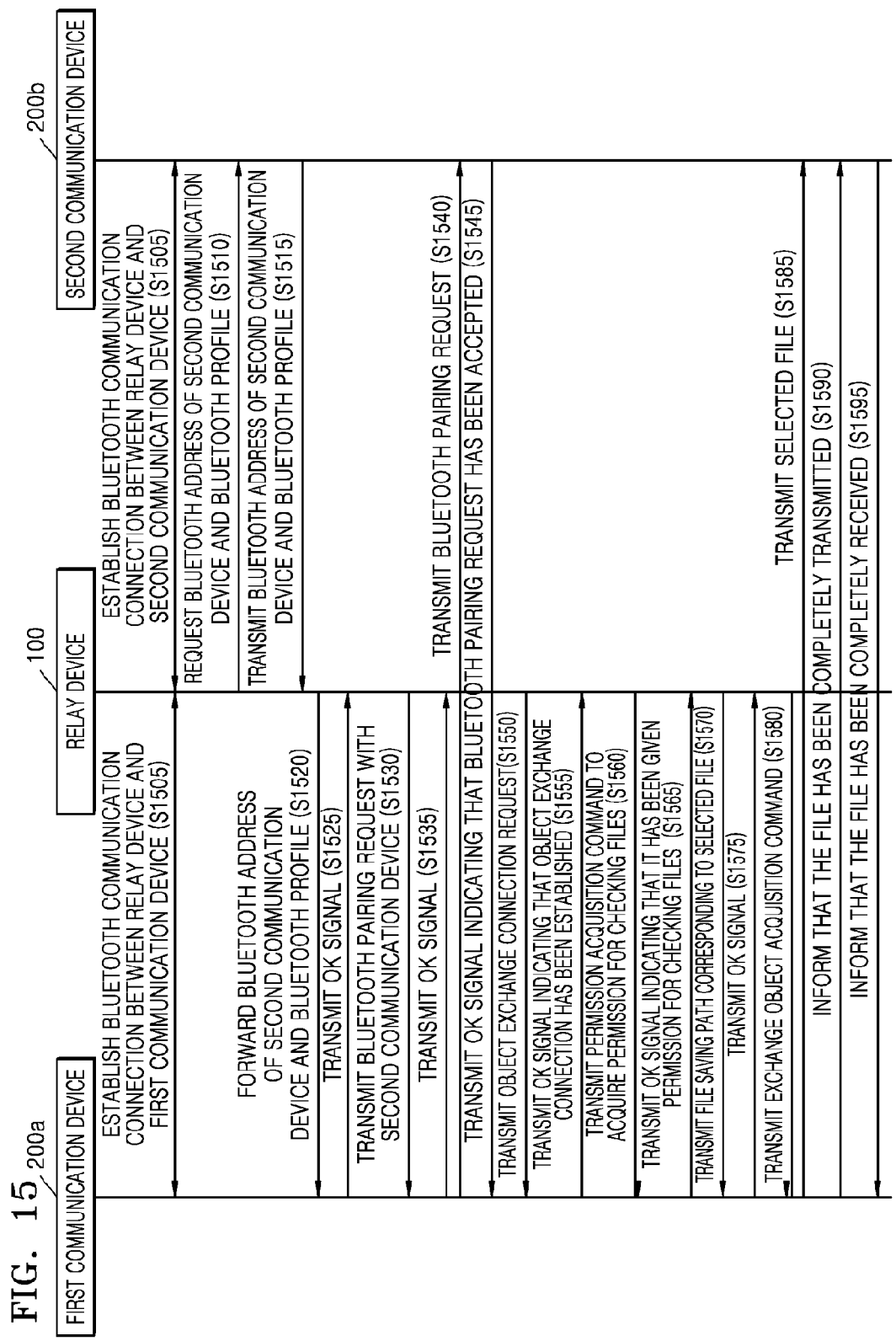
FIGS. 15 through 17 illustrate three examples of transmitting data between communication devices (i.e., a first communication device and a second communication device), according to exemplary embodiments.
Figure 16:
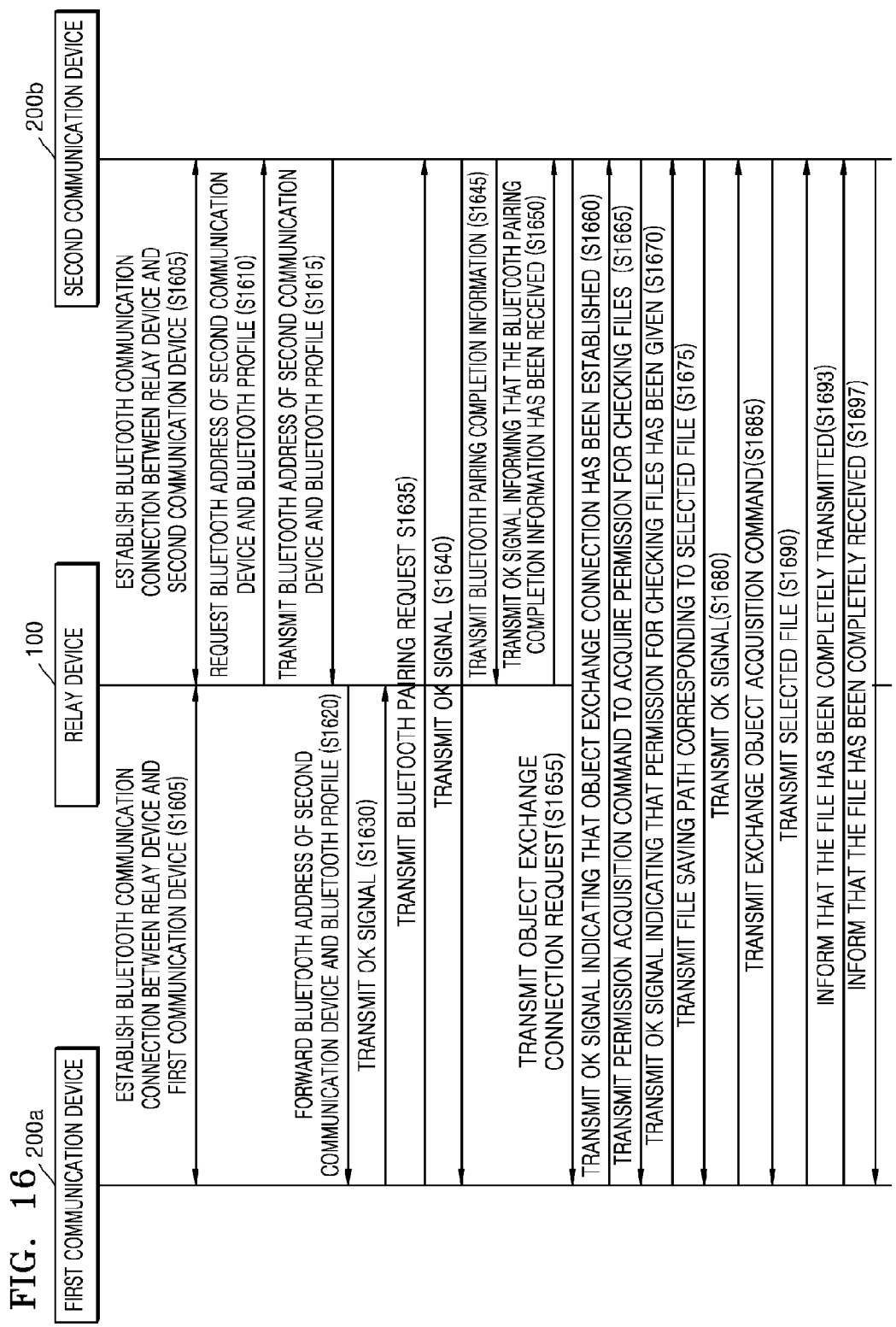
Figure 17:
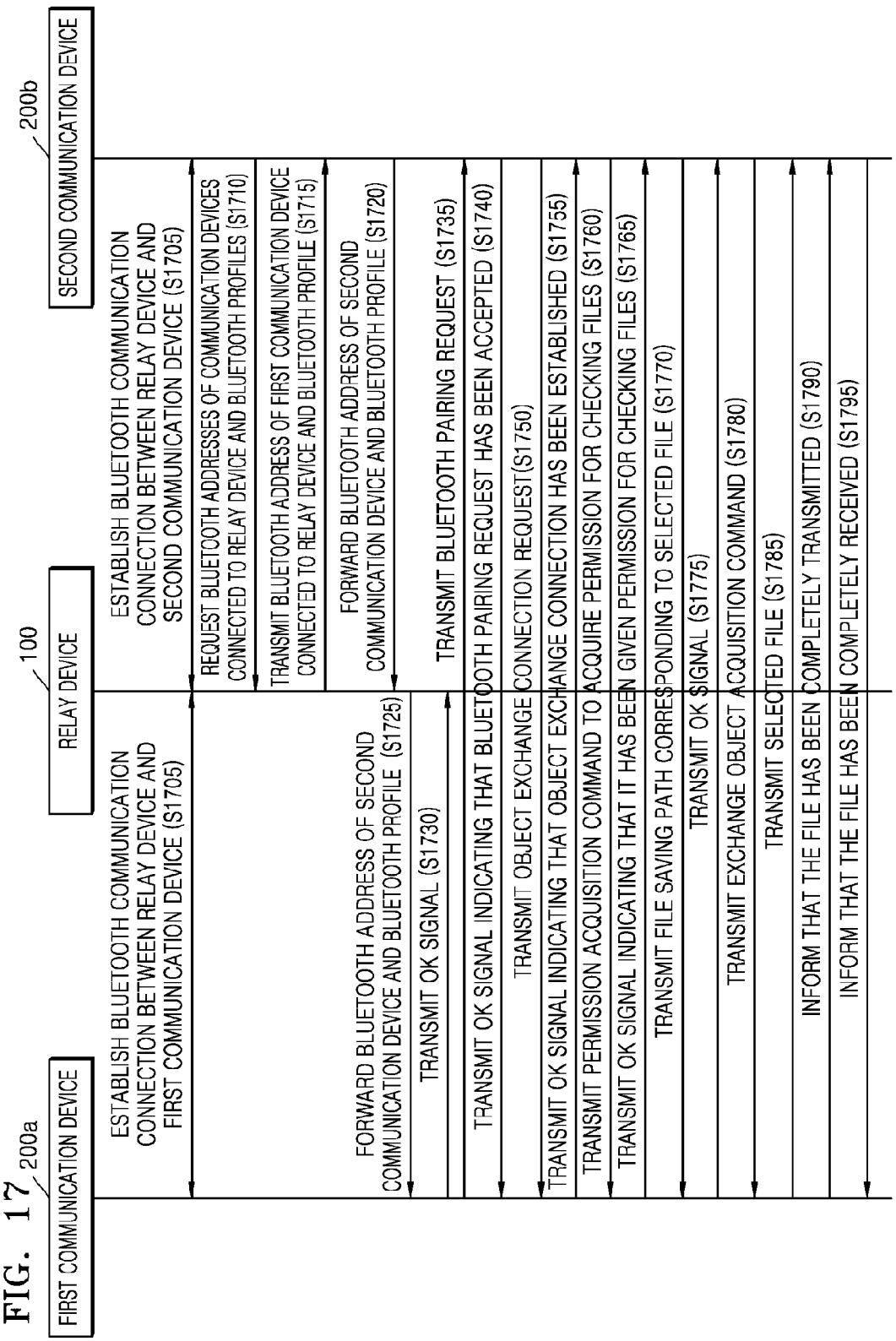

FIGS. 15 through 17 illustrate three examples of transmitting data between communication devices (i.e., the first communication device 200a and the second communication device 200b), according to exemplary embodiments.

In the three examples, taking a file and a BLUETOOTH communication for example, the specific procedure of transmitting data between two communication devices which have a short distance communication connection with the relay device 100 will be set forth. However, the present disclosure is not limited thereto.

The data transferred between the two communication devices may also be other types of non-file format data, and the short-distance communication may also be WI-FI direct communication or any other types of suitable short-distance communication. Moreover, in addition to the first communication device 200a and the second communication device 200b, there may be other communication devices connected to the relay device 100, and the FIGS. 15 through 17 merely illustrate two communication devices between which data transmission is enabled.

FIG. 15 illustrates an example of transmitting data between communication devices connected to the relay device 100, according to another exemplary embodiment.

Referring to FIG. 15, in operation S1505, a BLUETOOTH communication connection may be established between the relay device 100 and the first communication device 200a and the second communication device 200b, respectively.

In operation S1510, the relay device 100 may transmit to the second communication device 200b, an address acquisition command to acquire a BLUETOOTH address of the second communication device 200b and a BLUETOOTH profile supported by the second communication device 200b.

In operation S1515, in response to the address acquisition command, the second communication device 200b may transmit to the relay device 100, response information including the BLUETOOTH address of the second communication device 200b and the BLUETOOTH profile supported by the second communication device 200b.

In operation S1520, the relay device 100 may forward to the first communication device 200a, the BLUETOOTH address of the second communication device 200b and the BLUETOOTH profile received from the second communication device 200b.

In operation S1525, the first communication device 200a may transmit to the relay device 100, an OK signal informing that the BLUETOOTH address of the second communication device 200b and the BLUETOOTH profile have been received.

In operation S1530, the relay device 100 may transmit to the first communication device 200a, a request (i.e., a BLUETOOTH pairing request) to perform a Bluetooth pairing with the second communication device 200b.

In operation S1535, the first communication device 200a may transmit to the relay device 100, an OK signal informing that the BLUETOOTH pairing request has been received.

In operation S1540, the first communication device 200a may transmit to the second communication device 200b, a request (i.e., a BLUETOOTH pairing request) to perform a BLUETOOTH pairing with the second communication device 200b.

In operation S1545, the second communication device 200b may transmit to the first communication device 200a, an OK signal informing that the BLUETOOTH pairing request has been accepted.

Through operations S1505 through S1545, an association for data transmission may be established between the first communication device 200a and the second communication device 200b, so as to be prepared for data transmission between the two communication devices.

In operation S1550, the relay device 100 may transmit to the first communication device 200a, an object exchange (OBEX) connection request to instruct the first communication device 200a to be prepared to establish an object exchange connection.

The object exchange (OBEX) connection may be a specification for exchanging objects using wireless communication between two devices. The object exchange (OBEX) connection may be performed according to an object exchange (OBEX) file transfer protocol.

In operation S1555, the first communication device 200a may establish an object exchange (OBEX) connection with the relay device 100, and transmit to the relay device 100, an OK signal informing that the object exchange (OBEX) connection has been established.

In operation S1560, the relay device 100 may transmit to the first communication device 200a, a permission acquisition command to acquire permission for checking files in the first communication device 200a.

In operation S1565, the first communication device 200a may transmit to the relay device 100, an OK signal informing that relay device 100 has been given permission for checking files in the first communication device 200a.

The relay device 100 may receive metadata information of the files in the first communication device 200a from the first communication device 200a. The relay device 100 may display a list of the files in the first communication device 200a based on the received metadata information. In this case, the relay device 100 may display not only names of the files but also sizes of the files, types, and storage paths. The relay device may receive a user input that selects one communication device from the list of the displayed files.

In operation S1570, the relay device 100 may transmit a file saving path corresponding to a selected file to the first communication device 200a, to inform the first communication device 200a of the selected file required to be transmitted to the second communication device 200b.

In operation S1575, the first communication device 200a may transmit to the relay device 100, an OK signal informing that the file saving path has been received.

In operation S1580, the relay device 100 may transmit to the first communication device 200a, an exchange object acquisition command to instruct the first communication device 200a to transmit the selected file to the second communication device 200b.

In operation S1585, the first communication device 200a may transmit the selected file to the second communication device 200b.

Additionally, the first communication device 200a may inform the second communication device 200b of the completion of the file transfer.

Specifically, in operation S1590, the first communication device 200a may transmit to the second communication device 200b, an END signal informing that the file has been completely transmitted.

In operation S1595, the second communication device 200b may transmit to the first communication device 200a, an OK signal informing that the file has been completely received.

According to exemplary embodiments, the procedures performed in operations S1505 through S1595 for selecting, by the relay device 100, the file required to be transmitted and transmitting, by the first communication device 200a, the selected file comply with a file transfer profile specified in the FTP.

FIG. 16 illustrates an example of transmitting data between communication devices connected to the relay device 100, according to another exemplary embodiment.

Referring to FIG. 16, in operation S1605, a Bluetooth communication connection may be established between the relay device 100 and the first communication device 200a and the second communication device 200b, respectively.

In operation S1610, the second communication device 200b may request to the relay device 100, BLUETOOTH addresses of other communication devices connected to the relay device 100 and BLUETOOTH profiles.

In operation S1615, the second communication device 200b may transmit to the relay device 100, BLUETOOTH pairing information including a BLUETOOTH address of the second communication device 200b, a BLUETOOTH profile supported by the second communication device 200b, and a BLUETOOTH address of a communication device (i.e., the first communication device 200a) with which the second communication device 200b has established a BLUETOOTH pairing.

In operation S1620, the relay device 100 may forward the BLUETOOTH pairing information to the first communication device 200a.

In operation S1630, the first communication device 200a may transmit to the relay device 100, an OK signal informing that the BLUETOOTH pairing information has been received.

In operation S1635, the first communication device 200a may transmit to the second communication device 200b, a request (i.e., a Bluetooth pairing request) to perform a BLUETOOTH pairing with the second communication device 200b.

In operation S1640, the second communication device 200b may transmit to the first communication device 200a, an OK signal to inform the first communication device 200a that the BLUETOOTH pairing request has been accepted.

In operation S1645, the second communication device 200b may transmit to the relay device 100, BLUETOOTH pairing completion information indicating that the BLUETOOTH pairing has been established between the first communication device 200a and the second communication device 200b.

In operation S1650, the relay device 100 may transmit to the second communication device 200b, an OK signal to inform the second communication device 200b that the BLUETOOTH pairing completion information has been received.

Through operations S1605 through S1650, an association for data transmission may be established between the first communication device 200a and the second communication device 200b, so as to be prepared for data transmission between the two communication devices.

In operation S1655, the second communication device 200b may transmit to the first communication device 200a, an object exchange connection request to instruct the first communication device 200a to prepare for establishment of an object exchange connection.

In operation S1660, the first communication device 200a may transmit to the second communication device 200b, an OK signal informing that the object exchange connection has been established.

In operation S1665, the second communication device 200b may transmit to the first communication device 200a, a permission acquisition command to acquire permission for checking files in the first communication device 200a.

In operation S1670, the first communication device 200a may transmit to the second communication device 200b, an OK signal informing that second communication device 200b has been given permission for checking files in the first communication device 200a.

In operation S1675, the second communication device 200b may transmit a file saving path corresponding to a selected file to the first communication device 200a, to inform the first communication device 200a of the selected file required to be transmitted to the second communication device 200b.

In operation S1680, the first communication device 200a may transmit to the second communication device 200b, an OK signal to inform the relay device 100 that the file saving path has been received.

In operation S1685, the second communication device 200b may transmit to the first communication device 200a, an exchange object acquisition command to instruct the first communication device 200a to prepare for transmission of the selected file.

In operation S1690, the first communication device 200a may transmit the selected file to the second communication device 200b.

Additionally, the first communication device 200a and the second communication device 200b may be informed of the completion of the file transfer.

Specifically, in operation S1693, the first communication device 200a may transmit to the second communication device 200b, an END signal to inform the second communication device 200b that the file has been completely transmitted.

In operation S1697, the second communication device 200b may transmit to the first communication device 200a, an OK signal to inform the first communication device 200a that the file has been completely received.

The procedures performed in operations S1605 through S1697 for selecting, by the relay device 100, the file required to be transmitted and transmitting, by the first communication device 200a, the selected file comply with a file transfer profile specified in the FTP.

FIG. 17 illustrates an example of transmitting data between communication devices connected to the relay device 100, according to another exemplary embodiment.

Referring to FIG. 17, in operation S1705, a BLUETOOTH communication connection may be established between the relay device 100 and the first communication device 200a and the second communication device 200b, respectively.

In operation S1710, the second communication device 200b may request from the relay device 100, BLUETOOTH addresses of other communication devices connected to the relay device 100 and BLUETOOTH files.

In operation S1715, in response to a received request, the relay device 100 may transmit to the second communication device 200b, a corresponding inquiry result including a BLUETOOTH address of the first communication device 200a connected to the relay device 100.

In operation S1720, the second communication device 200b may transmit to the relay device 100, BLUETOOTH pairing information including a BLUETOOTH address of the second communication device 200b, a BLUETOOTH profile supported by the second communication device 200b, and a BLUETOOTH address of a communication device (i.e., the first communication device 200a) with which the second communication device 200b has established a BLUETOOTH pairing.

In operation S1725, the relay device 100 may forward the BLUETOOTH pairing information of the second communication device 200b to the first communication device 200a.

In operation S1730, the first communication device 200a may transmit to the relay device 100, an OK signal informing that the BLUETOOTH pairing information has been received.

In operation S1735, the first communication device 200a may transmit to the second communication device 200b, a request (i.e., a BLUETOOTH pairing request) to perform a BLUETOOTH pairing with the second communication device 200b.

In operation S1740, the second communication device 200b may transmit to the first communication device 200a, an OK signal to inform the first communication device 200a that the BLUETOOTH pairing request has been accepted by the second communication device 200b.

Through operations S1705 through S1740, an association for data transmission may be established between the first communication device 200a and the second communication device 200b, so as to be prepared for data transmission between the two communication devices.

In operation S1750, the second communication device 200b may transmit to the first communication device 200a, an object exchange connection request to instruct the first communication device 200a to prepare for establishment of an object exchange connection.

In operation S1755, the first communication device 200a may establish an object exchange connection with the second communication device 200b, and transmit to the second communication device 200b, an OK signal to inform the second communication device 200b that the object exchange connection has been established.

In operation S1760, the second communication device 200b may transmit to the first communication device 200a, a permission acquisition command to acquire permission for checking files in the first communication device 200a.

In operation S1765, the first communication device 200a may transmit to the second communication device 200b, an OK signal informing that second communication device 200b has been given permission for checking files in the first communication device 200a.

In operation S1770, the second communication device 200b may transmit a file saving path corresponding to a selected file to the first communication device 200a, to inform the first communication device 200a of the selected file required to be transmitted to the second communication device 200b.

In operation S1775, the first communication device 200a may transmit to the second communication device 200b, an OK signal to inform the second communication device 200b that the file saving path has been received.

In operation S1780, the second communication device 200b may transmit to the first communication device 200a, an exchange object acquisition command to instruct the first communication device 200a to prepare for transmission of the selected file.

In operation S1785, the first communication device 200a may transmit the selected file to the second communication device 200b.

Additionally, the first communication device 200a and the second communication device 200b may be informed of the completion of the file transfer.

Specifically, in operation S1790, the first communication device 200a may transmit to the second communication device 200b, an END signal to inform the second communication device 200b that the file has been completely transmitted.

In operation S1795, the second communication device 200b may transmit to the first communication device 200a, an OK signal to inform the first communication device 200a that the file has been completely received.

The procedures performed in operations S1705 through S1795 for selecting, by the second communication device 200b, the file required to be transmitted and transmitting, by the first communication device 200a, the selected file comply with a file transfer profile specified in the FTP.

The examples of transmitting data between the first communication device 200a and the second communication device 200b controlled by the relay device 100 have been described above with reference to FIGS. 15 and 17. However, the present disclosure is not limited to the above examples. For example, although the data transmission is requested by the relay device 100 to receive the data in FIGS. 15 and 17, it should be understood by those skilled in the art that the present disclosure is not limited thereto, and the case that data transmission is requested by the communication device to transmit the data may also be applicable.

Figure 18:
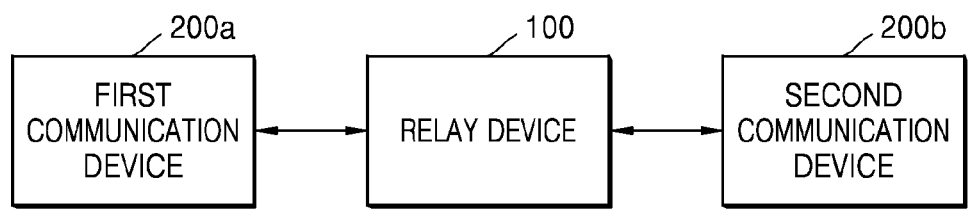
FIG. 18 is a block diagram of a system in which a relay device transmits data between a plurality of communication devices, according to an exemplary embodiment.

FIG. 18 is a block diagram of a system in which the relay device 100 transmits data between a plurality of communication devices, according to an exemplary embodiment.

As illustrated in FIG. 18, the system for transmitting data between communication devices connected to the relay device 100 according to an exemplary embodiment may include the relay device 100 and at least two communication devices (including the first communication device 200a, the second communication device 200b, and etc.) connected to the relay device 100.

It should be understood that other communication devices except the first communication device 200a and the second communication device 200b are illustrated in FIG. 18.

Specifically, the relay device 100 may establish a short-distance communication connection with the at least two communication devices, and establish an association between two communication devices (i.e., the first communication device 200a and the second communication device 200b) among the at least two communication devices, so as to be prepared for data transmission between the first communication device 200a and the second communication device 200b.

In an exemplary embodiment, after the association is established between the first communication device 200a and the second communication device 200b, the relay device 100 may receive data from the first communication device 200a, and forward the received data to the second communication device 200b.

In a further exemplary embodiment, after the association is established between the first communication device 200a and the second communication device 200b, the relay device 100 may select data to be transmitted to the second communication device 200b from the first communication device 200a, and control the first communication device 200a to transmit the selected data to the second communication device 200b.

In a still further exemplary embodiment, after the association is established between the first communication device 200a and the second communication device 200b, the first communication device 200a may transmit the selected data to the second communication device 200b, or the second communication device 200b may select data to be transmitted to the second communication device 200b from the first communication device 200a, and control the first communication device 200a to transmit the selected data to the second communication device 200b.

It should be understood that the relay device 100 and the communication devices in the system illustrated in FIG. 18 may operate in accordance with the detailed descriptions of the exemplary embodiments with reference to FIGS. 1 through 6 and 10 through 17.

As mentioned above, in the device and method of transmitting data between communication devices connected to the relay device 100, and the system thereof, the data transmission between the communication devices may be enabled through connecting to the relay device 100, to achieve the control over the data transmission between the communication devices.

Figure 19:
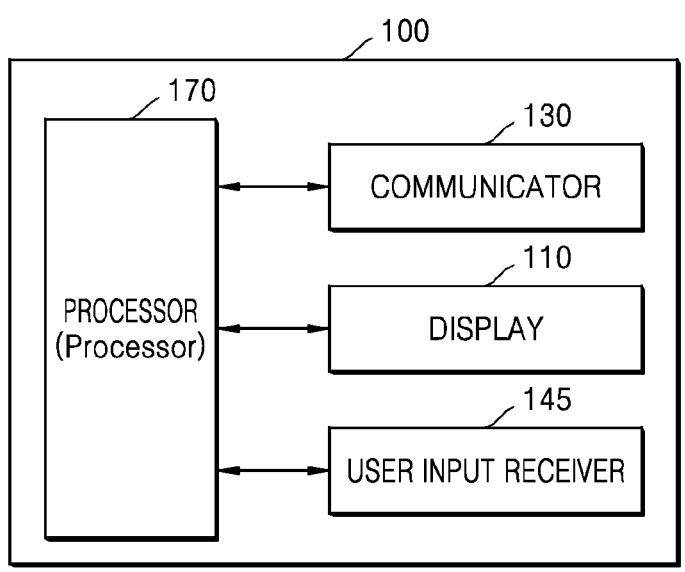
FIG. 19 is a block diagram of a relay device, according to an exemplary embodiment.

FIG. 19 is a block diagram of the relay device 100, according to an exemplary embodiment.

As shown in FIG. 19, the relay device 100 according to an exemplary embodiment may include a processor 170, a communicator 130, a user input receiver 145, and a display 110. However, not all components shown in FIG. 19 are essential. In other words, the relay device 100 may include more or less components than those shown in FIG. 19.

The communicator 130 may transmit and receive data to and from an external device.

The communicator 130 may establish a short distance wireless communication connection with a communication device. Short distance wireless communication may include BLUETOOTH communication, WI-FI direct communication but is not limited thereto.

The processor 170 may control components included in the relay device 100.

For example, the processor 170 may transmit to the first communication device 200a, information regarding at least one device connectable to the relay device 100, may receive from the first communication device 200a, a data relay request to request transmission of data to the second communication device 200b selected by a user of the first communication device 200a among the at least one device, and in response to the data relay request, may control a short distance wireless communication unit to transmit the data received from the first communication device 200a to the second communication device 200b.

The processor 170 may determine whether the short distance wireless communication connection is established between the second communication device 200b and communicator 130 upon receiving the data relay request from the first communication device 200a with respect to the second communication device 200b, and may control a storage to store the data received from the first communication device 200a in the relay device 100 if the short distance wireless communication connection is not established between the second communication device 200b and the communicator 130.

The relay device 100 may further include a storage. The processor 170 may store the data received from the first communication device 200a in the storage.

The processor 170 may store the data received from the first communication device 200a, and then, if the short distance wireless communication connection is established between the second communication device 200b and the communicator 130, may control the communicator 130 to transmit the stored data to the second communication device 200b.

The processor 170 may transmit to the second communication device 200b, an acknowledge request to acknowledge whether to receive the data from the first communication device 200a upon receiving the data relay request from the first communication device 200a with respect to the second communication device 200b and may control the communicator 130 to transmit the data received from the first communication device 200a to the second communication device 200b based on response information for the acknowledge request received from the second communication device 200b.

The display 110 may display identification information of the data stored in the relay device 100 if the short distance wireless communication connection is established between the second communication device 200b and the communicator 130.

The connection establishment unit 180 of FIG. 7 may be included in the communicator 130 of FIG. 19. The association establishment unit 185 of FIG. 7 and the data forwarding unit 190 and the data transmission control unit 195 of FIG. 8 may be included in the processor 170 of FIG. 19.

Figure 20:
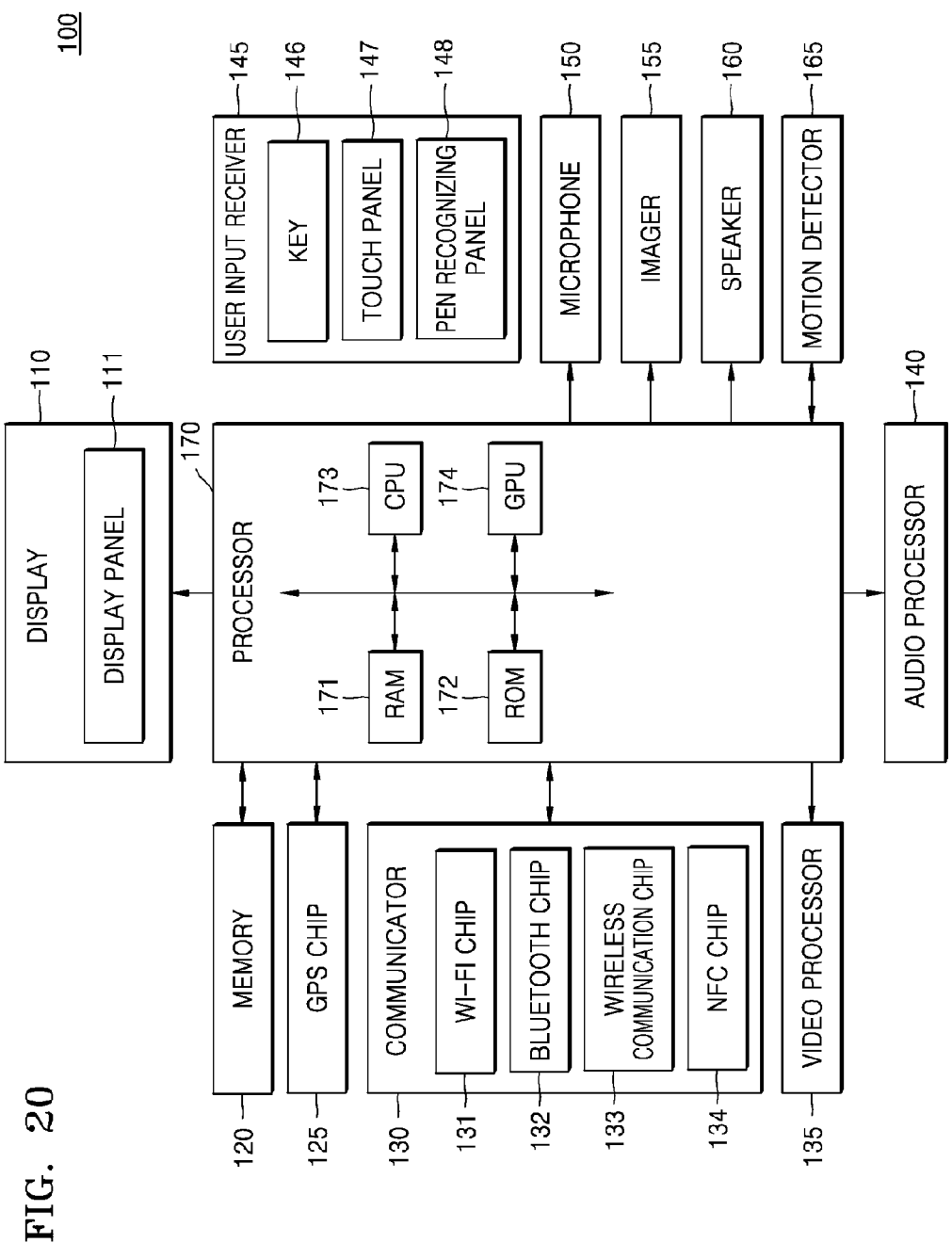
FIG. 20 is a block diagram of a relay device or a communication device, according to an exemplary embodiment.

FIG. 20 is a block diagram of a communication device 200, according to an exemplary embodiment. In some exemplary embodiments, first communication device 200a can be a communication device 200 and second communication device 200b can be a communication device 200. In some exemplary embodiments, relay device 100 can be a communication device 200.

As shown in FIG. 20, the communication device 200 may be any one of various devices, such as a camera, a mobile phone, a tablet PC, a PDA, an MP3 player, a kiosk, an electronic frame, a navigation device, a digital TV, a wrist watch, or a head-mounted display (HMD).

Referring to FIG. 20, the communication device 200 may include at least one of the display 110, the processor 170, the memory 120, a global positioning system (GPS) chip 125, the communicator 130, a video processor 135, an audio processor 140, a user input receiver 145, a microphone unit 150, the imaging unit 155, a speaker unit 160, and a motion detector 165.

Also, the display 110 may include a display panel 111 and a controller that controls the display panel 111. The display panel 111 may be realized in a display of any type, such as a liquid crystal display (LCD), an organic light-emitting diode (OLED) display, an active-matrix OLED (AM-OLED), or a plasma display panel (PDP). The display panel 111 may be flexible, transparent, or wearable. The display 110 may be provided as a touch screen by being combined with a touch panel 147 of the user input receiver 145. For example, the touch screen may include an integrated module in which the display panel 111 and the touch panel 147 are combined in a stacked structure.

The memory 120 may include at least one of an internal memory and an external memory.

Examples of the internal memory include volatile memories (for example, a dynamic random access memory (DRAM), a static RAM (SRAM), and a synchronous DRAM (SDRAM)), nonvolatile memories (for example, a one-time programmable read-only memory (OTPROM), a programmable ROM (PROM), an erasable and programmable ROM (EPROM), an electrically erasable and programmable ROM (EEPROM), a mask ROM, and a flash ROM), a hard disk drive (HDD), and a solid state drive (SSD). According to an exemplary embodiment, the processor 170 may load, on a volatile memory, a command or data received from at least one of nonvolatile memories or other components, and process the command or data. Also, the processor 170 may store data received from or generated by other components in a nonvolatile memory.

Examples of the external memory include a compact flash (CF) memory, a secure digital (SD) memory, a micro SD memory, a mini-SD memory, an extreme digital (XD) memory, and a memory stick.

The memory 120 may store various programs and data used to operate the device 200. For example, the memory 120 may temporarily or semi-permanently store at least a part of content to be displayed on a lock screen.

The processor 170 may control the display 110 such that a part of content stored in the memory 120 is displayed on the display unit 110. In other words, the processor 170 may display the part of the content stored in the memory 120 on the display unit 110. Alternatively, the processor 170 may perform a control operation corresponding to a user gesture when the user gesture is performed on one region of the display unit 110.

The processor 170 may include at least one of an RAM 171, an ROM 172, a central processing unit (CPU) 173, a graphic processing unit (GPU) 174, and a bus 175. The RAM 171, the ROM 172, the CPU 173, and the GPU 174 may be connected to each other via the bus 175.

The CPU 173 accesses the memory 120 and performs booting by using an operating system (OS) stored in the memory 120. Also, the CPU 173 performs various operations by using various programs, contents, and data stored in the memory 120.

Command sets for system booting are stored in the ROM 172. For example, when power is supplied to the device 200 as a turn-on command is input, the CPU 173 may copy an OS stored in the memory 120 to the RAM 171 according to a command stored in the ROM 172, and execute the OS for the system booting. When the system booting is completed, the CPU 173 copies various programs stored in the memory 120 to the RAM 171, and executes the programs copied in the RAM 171 to perform various operations. When the system booting is completed, the GPU 174 displays a user interface screen in a region of the display unit 110. In detail, the GPU 174 may generate a screen displaying an electronic document including various objects, such as content, an icon, and a menu. The GPU 174 calculates attribute values, such as coordinate values, shapes, sizes, and colors, of the various objects according to a layout of the screen. Then, the GPU 174 may generate the screen having any one of various layouts based on the calculated attribute values. The screen generated by the GPU 174 may be provided to the display unit 110 and displayed on each region of the display unit 110.

The GPS chip 125 may receive a GPS signal from a GPS satellite, and calculate a current location of the device 200. The processor 170 may calculate the location of the device 200 by using the GPS chip 125 when a navigation program is used or when a current location of the user is required.

The communicator 130 may communicate with an external device by using any one of various communication methods. The communicator 130 may include at least one of a WI-FI chip 131, a BLUETOOTH chip 132, a wireless communication chip 133, and a near-field communication (NFC) chip 134. The processor 170 may communicate with any one of various external devices by using the communicator 130.

The WI-FI chip 131, the BLUETOOTH chip 132 may perform communication by respectively using a WI-FI method and a BLUETOOTH method. When the WI-FI chip 131 or the BLUETOOTH chip 132 is used, various types of connection information, such as subsystem identification (SSID) or a session key, are first transferred, and then various types of information may be transferred by using the connection information. The wireless communication chip 133 is a chip that performs communication according to any one of various communication standards, such as IEEE, ZIGBEE, 3RD GENERATION (3G), 3RD GENERATION PARTNERSHIP PROJECT (3GPP), and LTE. The NFC chip 134 is a chip that operates by using an NFC method using a frequency band of 13.56 MHz from among radio frequency identification (RFID) frequency bands, such as 135 kHz, 13.56 MHz, 433 MHz, 860 through 960 MHz, and 2.45 GHz.

The video processor 135 may process video data included content received through the communicator 130 or included in content stored in the memory 120. The video processor 135 may perform various image processes, such as decoding, scaling, noise-filtering, frame rate changing, and resolution changing, on video data.

The audio processor 140 may process audio data included in content received through the communicator 130 or included in content stored in the memory 120. The audio processor 140 may perform various processes, such as decoding, amplifying, and noise-filtering, on audio data.

When a reproduction program regarding multimedia content is executed, the processor 170 may reproduce the multimedia content by driving the video processor 135 and the audio processor 140. The speaker unit 160 may output audio data generated by the audio processor 140.

The user input receiver 145 may receive various commands from the user. The user input receiver 145 may include at least one of a key 146, the touch panel 147, and a pen recognizing panel 148.

The key 146 may include various types of keys, such as a mechanical button and a wheel, which are formed on various regions, such as a front region, a side region, and a rear region, of an external body of the device 200.

The touch panel 147 may detect a touch input of the user, and output a touch event value corresponding to the touch input. When the touch panel 147 forms a touch screen by combining with the display panel 111, the touch screen may include as a touch sensor in any type, such as an electrostatic type, a pressure type, or a piezoelectric type. The electrostatic type touch sensor calculates a touch coordinate by detecting micro-electricity induced by a body of the user when the body of the user touches a surface of the touch screen, by using a dielectric substance coated on the surface of the touch screen. The pressure type touch sensor calculates a touch coordinate by detecting a current generated as upper and lower electrode plates included in the touch screen contact each other when the user touches the touch screen. A touch event generated on the touch screen may be mainly generated by a finger of the user, but may alternatively generated by an object formed of a conductive material that may generate a change in electrostatic capacitance.

The pen recognizing panel 148 may detect a proximity input or a touch input of a touch pen, such as a stylus pen or a digitizer pen, and output a pen proximity event or a pen touch event. The pen recognizing panel 148 may use an electromagnetic radiation (EMR) method, and detect the proximity input or the touch input based on a change of intensity of an electromagnetic field, which is caused by approach or touch of the touch pen. In detail, the pen recognizing panel 148 may include an electron inducing coil sensor having a grid structure, and an electronic signal processor that provides an alternating signal having a certain frequency sequentially to loop coils of the electron inducing coil sensor. When a pen including a resonance circuit is near the loop coil of the pen recognizing panel 148, a magnetic field transmitted from the loop coil generates a current based on mutual electron induction, in the resonance circuit. Then, based on the current, an induction magnetic field is generated from a coil forming the resonance circuit, and the pen recognizing panel 148 detects the induction magnetic field from a loop coil in a signal reception state, thereby detecting a proximity or touch location of the pen. The pen recognizing panel 148 may have an area for covering a certain area below the display panel 111, for example, a display region of the display panel 111.

The microphone 150 may change user's voice or other sound to audio data. The processor 170 may use the user's voice for a call operation, or store the audio data in the memory 120.

The imager 155 may capture a still image or a moving image based on control of the user. The imager 155 may include a plurality of cameras, such as a front camera and a rear camera.

When the imager 155 and the microphone 150 are provided, the processor 170 may perform a control operation according user's voice input through the microphone 150 or user motion recognized by the imager 155. For example, the device 200 may operate in a motion control mode or a voice control mode. When the device 200 is in a motion control mode, the processor 170 may activate the imager 155 to photograph the user, and perform a control operation by tracking a motion change of the user. When the device 200 is in a voice control mode, the processor 170 may analyze user's voice input through the microphone 150, and perform a control operation based on the analyzed user's voice.

The motion detector 165 may detect movement of the body of the device 200. The device 200 may rotate or tilt in any one of various directions. At this time, the motion detector 165 may detect a movement characteristic, such as a rotation direction, a rotation angle, or a tilted angle, by using at least one of various sensors, such as a terrestrial magnetic sensor, a gyro sensor, and an acceleration sensor.

According to one or more exemplary embodiments, communication device 200 may further include a universal serial bus (USB) port to which a USB connector is connected, various external input ports to which various external terminals, such as a headset, a mouse, and a LAN cable, are connected, a digital multimedia broadcasting (DMB) chip that receives and processes a DMB signal, and various sensors.

Names of the components of communication device 200 described above may be changed. Also, the communication device 200 may include at least one of the components described above, may not include some of the components, or may further include other components.

One or more exemplary embodiments may also be embodied as computer-readable codes on a computer-readable recording medium. The computer-readable recording medium is any data storage device that can store data which can be thereafter read by a computer system. The computer-readable codes are configured to perform operations realizing a method of controlling an electronic apparatus according to one or more exemplary embodiments when read from the computer-readable recording medium and executed by a processor. The computer-readable codes may be in various programming languages. Also, functional programs, codes, and code segments for accomplishing one or more exemplary embodiments may be easily construed by programmers skilled in the art to which the one or more exemplary embodiments pertains. Examples of the computer-readable recording medium include read-only memory (ROM), random-access memory (RAM), CD-ROMs, magnetic tapes, floppy disks, optical data storage devices, etc. The computer-readable recording medium may also be distributed over network coupled computer systems so that the computer-readable code is stored and executed in a distributed fashion.

It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A relay device comprising:
   a short distance wireless communicator configured to establish a short distance wireless communication connection between the relay device and a first communication device; and
   a processor configured to transmit to the first communication device information regarding at least one device connectable to the relay device, receive from the first communication device a data relay request requesting a transmission of data to a second communication device selected by a user of the first communication device from the at least one device connectable to the relay device, and control the short distance wireless communicator to transmit the data from the first communication device to the second communication device in response to the data relay request,
   wherein upon receiving the data relay request, the processor is configured to transmit to the second communication device an acknowledge request requesting the second communication device to acknowledge whether to receive the data, to receive from the second communication device a response to the acknowledge request, to transmit the response to the first communication device and to transmit the data to the second communication device based on the response.

2. The relay device of claim 1, wherein the information regarding the at least one device comprises: at least one of a name of the at least one device, BLUETOOTH profile information, and information indicating whether a wireless communication connection is established between the relay device and the at least one device.

3. The relay device of claim 1, wherein the at least one device connectable to the relay device comprises a communication device that is paired with the relay device and connection information of the at least one device is stored in the relay device.

4. The relay device of claim 3, wherein the connection information of the at least one device comprises at least one of a BLUETOOTH address and a link key.

5. The relay device of claim 1, further comprising: a storage configured to store the data received from the first communication device,
   wherein the processor is further configured to determine whether the short distance wireless communication connection is established between the second communication device and the short distance wireless communicator upon receiving the data relay request from the first communication device, and, if the short distance wireless communication connection is not established between the second communication device and the short distance wireless control, the processor is further configured to control the storage unit to store the data received from the first communication device in the relay device.

6. The relay device of claim 5, wherein the processor is further configured to store the data received from the first communication device, and then, if the short distance wireless communication connection is established between the second communication device and the short distance wireless communication unit, transmit the stored data to the second communication device.

7. The relay device of claim 6, further comprising: a display configured to display identification information of the data stored in the relay device if the short distance wireless communication connection is established between the second communication device and the short distance wireless communication unit.

8. A data relay method comprising:
   establishing a short distance wireless communication connection between a relay device and a first communication device;
   transmitting information regarding at least one device connectable to the relay device to the first communication device;
   receiving, from the first communication device, a data relay request requesting a transmission of data to a second communication device selected by a user of the first communication device from the at least one device; and
   transmitting the data to the second communication device in response to the data relay request,
   wherein the transmitting of the data to the second communication device in response to the data relay request comprises:
   upon receiving the data relay request from the first communication device, transmitting to the second communication device an acknowledge request requesting the second communication device to acknowledge whether to receive the data;
   receiving from the second communication device a response to the acknowledge request;
   transmitting, the response to the first Communication device; and
   transmitting the data to the second communication device based on the response.

9. The method of claim 8, wherein the information regarding the at least one device includes: at least one of a name of the at least one device, BLUETOOTH profile information, and information indicating whether a wireless communication connection is established between the relay device and the at least one device.

10. The method of claim 8, wherein the at least one device connectable to the relay device includes a communication device that is paired with the relay device and connection information of the at least one device is stored in the relay device.

11. The method of claim 10, wherein the connection information of the at least one device includes at least one of a BLUETOOTH address and a link key.

12. The method of claim 8, wherein the transmitting of the data to the second communication device in response to the data relay request comprises:
 determining whether a short distance wireless communication connection is established between the second communication device and relay device upon receiving a data relay request from the first communication device; and
 if the short distance wireless communication connection is not established between the second communication device and the relay device, storing the data from the first communication device in the relay device.

13. The method of claim 12, wherein the transmitting of the data to the second communication device in response to the data relay request comprises:
 storing the data, and then, if the short distance wireless communication connection is established between the second communication device and the relay device, transmitting the stored data to the second communication device.

14. The method of claim 13, further comprising: displaying identification information of the stored data if the short distance wireless communication connection is established between the second communication device and the relay device.

15. A first communication device comprising:
 a short distance wireless communicator configured to establish a short distance wireless communication connection between the first communication device and a relay device; and
 a processor configured to receive from the relay device information regarding at least one device connectable to the relay device, transmit to the relay device a data relay request requesting a transmission of data to a second communication device selected by a user of the first communication device from the at least one device connectable to the relay device, receive from the relay device a response which is received from the second communication device to the relay device, and to control the short distance wireless communicator to transmit the data to the relay device.

16. The communication device of claim 15, wherein the information regarding the at least one device comprises: at least one of a name of the at least one device, BLUETOOTH profile information, and information indicating whether a wireless communication connection is established between the relay device and the at least one device.

17. A data relay method comprising:
 establishing a short distance wireless communication connection between a relay device and a first communication device;
 receiving from the relay device information regarding at least one device connectable to the relay device;
 selecting a second communication device from the at least device based on the information regarding the at least one device;
 transmitting a data relay request to the relay device from the first communication device, the data relay request requesting a transmission of data to the second communication device;
 transmitting the data to the relay device; and
 transmitting the data to the second communication device in response to the data relay request,
 wherein transmitting of the data to the second communication device comprises:
 upon receiving the data relay request from the first communication device, transmitting to the second communication device an acknowledge request requesting the second communication device to acknowledge whether to receive the data;
 receiving from the second communication device a response to the acknowledge request; and
 transmitting the data to the second communication device based on the response.

18. The method of claim 17, wherein the information regarding the at least one device includes: at least one of a name of the at least one device, BLUETOOTH profile information, and information indicating whether a wireless communication connection is established between the relay device and the at least one device.

* * * * *